US008873934B2

(12) United States Patent
Takashima et al.

(10) Patent No.: US 8,873,934 B2
(45) Date of Patent: Oct. 28, 2014

(54) CPS UNIT MANAGEMENT IN THE DISC FOR DOWNLOADED DATA

(75) Inventors: Yoshikazu Takashima, Los Angeles, CA (US); Shinobu Hattori, Tokyo (JP); Saravana Prabhu Anbananthan, Los Angeles, CA (US)

(73) Assignee: Sony Corporation, Tokyo (JP)

( * ) Notice: Subject to any disclaimer, the term of this patent is extended or adjusted under 35 U.S.C. 154(b) by 1084 days.

(21) Appl. No.: 12/415,694

(22) Filed: Mar. 31, 2009

(65) Prior Publication Data

US 2009/0269042 A1    Oct. 29, 2009

Related U.S. Application Data

(60) Provisional application No. 61/041,126, filed on Mar. 31, 2008.

(51) Int. Cl.
| | |
|---|---|
| *G06F 21/00* | (2013.01) |
| *G11B 20/00* | (2006.01) |
| *G06F 13/30* | (2006.01) |
| *H04N 5/85* | (2006.01) |
| *G06F 21/10* | (2013.01) |

(52) U.S. Cl.
CPC .. *G11B 20/00086* (2013.01); *G11B 2220/2516* (2013.01); *G11B 2220/2541* (2013.01); *G11B 20/00869* (2013.01); *G11B 20/00862* (2013.01); *G11B 20/00427* (2013.01); *G11B 2220/41* (2013.01); *G11B 20/00362* (2013.01); *G06F 13/30* (2013.01); *H04N 5/85* (2013.01); *G06F 21/10* (2013.01); *G11B 20/00528* (2013.01); *G11B 20/00731* (2013.01)
USPC ......................................... 386/252; 386/240

(58) Field of Classification Search
CPC ..... G11B 20/00427; H04N 5/85; G06F 13/30
USPC .......................................... 386/252, 248, 240
See application file for complete search history.

(56) References Cited

U.S. PATENT DOCUMENTS

| | | | | |
|---|---|---|---|---|
| 5,864,870 | A | * | 1/1999 | Guck ............................. 707/104 |
| 2004/0218900 | A1 | * | 11/2004 | Yoon et al. ...................... 386/46 |
| 2004/0220926 | A1 | * | 11/2004 | Lamkin et al. .................... 707/3 |
| 2005/0289139 | A1 | | 12/2005 | Takashima et al. |

(Continued)

FOREIGN PATENT DOCUMENTS

| | | |
|---|---|---|
| JP | 2007-128584 A | 5/2007 |
| KR | 10-2006-0080327 | 7/2006 |

OTHER PUBLICATIONS

International Search Report and Written Opinion issued in PCT/US2009/038999 on Nov. 12, 2009.

(Continued)

*Primary Examiner* — Hadi Armouche
*Assistant Examiner* — Dao Ho
(74) *Attorney, Agent, or Firm* — Sony Corporation

(57) ABSTRACT

An information processing device comprising: a data processing unit configured to load a disk, which stores content that is divided into content usage control units, and to execute processes for reading the content; and a local storage unit configured to store subsequential data obtained and/or generated subsequentially, wherein the data processing unit is configured to perform processes to: select a title that is an index for reading the subsequential data from dummy titles stored in advance on the disk; set the title as a title for the subsequential data; and store the subsequential data in the local storage unit.

20 Claims, 22 Drawing Sheets

(56) References Cited

U.S. PATENT DOCUMENTS

2006/0153021 A1 7/2006 Seo et al.
2006/0227973 A1 10/2006 Takashima et al.
2007/0194117 A1 8/2007 Takashima et al.

OTHER PUBLICATIONS

European Extended Search Report issued on May 9, 2014 in EP patent application No. 09755400.0.

* cited by examiner

| INDEX (TITLES, etc., INDEX THAT CAN BE CATEGORIZED IN THE APPLICATION LAYER) | CONTENT CONTROL UNIT NUMBER (CPS UNIT NUMBER) | ENCODED CPS UNIT KEY |
|---|---|---|
| Title 1 | CPS1 | [Ku 1] |
| Title 2 | CPS1 | [Ku 1] |
| Application 1 | CPS2 | [Ku 2] |
| Application 2 | CPS3 | [Ku 3] |
| ⋮ | ⋮ | ⋮ |
| Data Group 1 | CPS4 | [Ku 4] |
| Data Group 2 | CPS5 | [Ku 5] |
| ⋮ | ⋮ | ⋮ |

FIG. 4

| Title # | CPS Unit # | AACS Encryption | Usage Control Info (Basic CCI) | Note | Disc1 MVObj/BDJO | Disc2 MVObj/BDJO |
|---|---|---|---|---|---|---|
| First Play | 1 | Encrypted (Disc Specific Key) | Copy Never | CPS Unit for Disc Specific Titles (on Disc or Downloaded). Disc specific AACS Key is assigned and no sharing of AV Stream files among package titles. | MVObj x0000 | MVObj x0000 |
| Top Menu | | | | | MVObj 0x0001 | MVObj 0x0001 |
| 1 | | | | | 00000.bdjo | 00000.bdjo |
| : | | | | | MVObj | MVObj |
| 180 | | | | | MVObj | MVObj |
| 181 | | | | Titles for VFS Update (invisible for users and go back to tiel for BD-Live Application after VFS update) | MVObj | MVObj |
| : | | | | | MVObj | MVObj |
| 200 | | | | | 00005.bdjo | 05000.bdjo |
| 201 | 2 | Encrypted (Common Key) | Copy Never | CPS Unit for the sharing AACS Encrypted AV Stream files (for SPHE content sharing) | 00005.bdjo | 05000.bdjo |
| : | | | | | MVObj | MVObj |
| 300 | | | | | MVObj | MVObj |
| 301 | 3 | Encrypted (Common Key) | Copy Never | CPS Unit for the sharing AACS Encrypted AV Stream files (for non-SPHE content sharing) | 00005.bdjo | 05000.bdjo |
| : | | | | | MVObj | MVObj |
| 400 | | | | | MVObj | MVObj |
| 401 | 4 | Plain | Copy Free | CPS Unit for the sharing Plain AV Stream files. | 00005.bdjo | 05000.bdjo |
| : | | | | | MVObj | MVObj |
| 500 | | | | | 00005.bdjo | MVObj |
| 501 | Reserved | – | – | Not Recorded on Disc | – | – |
| : | | | | | – | – |
| 999 | | | | | – | – |

FIG. 7

| FILENAME IN LOCAL STORAGE | STUDIO ID | PACKAGE ID | FILENAME AFTER CONVERSION |
|---|---|---|---|
| studioA.STREAM.00001.m2ts | 1 | 123 | BDMV/STREAM/00001.m2ts |
| studioA.CLIPINF.00001.clpi | 1 | 123 | BDMV/CLIPINF/00001.clpi |
| studioB.STREAM.01001.m2ts | 1,2,5 | (all) | BDMV/STREAM/01001.m2ts |
| studioB.CLIPINF.01001.clpi | 1,2,5 | (all) | BDMV/CLIPINF/01001.clpi |
| studioC.STREAM.00002.m2ts | 1 | 123 | BDMV/STREAM/00002.m2ts |
| studioC.STREAM.00002.m2ts | 2 | 456 | BDMV/STREAM/00012.m2ts |
| studioD.jmaku.dat | 1 | 123 | BDMV/STREAM/00099.m2ts |

FIG. 19

CPS UNIT MANAGEMENT IN THE DISC FOR DOWNLOADED DATA

CROSS-REFERENCE TO RELATED APPLICATIONS

This application claims the benefit of priority of U.S. Provisional Patent Application No. 61/041,126, filed Mar. 31, 2008, entitled "CPS Unit Management in the Disc for Downloaded Data." English-language translation of the above-referenced provisional application and statement that the translation is accurate has been filed in the provisional application. The disclosures of the above-referenced provisional application and the translation of the provisional application are incorporated herein by reference.

BACKGROUND

1. Field of the Invention

The present invention relates to information processing. More specifically, the present invention relates to efficiently processing and acquiring subsequential data such that a content certificate updating process can be omitted.

2. Background

Audio data such as music, video data such as movies, game programs, various types of application programs, and the like, and various types of software data (hereinafter termed "content") can be stored on information recording media such as, for example, a Blu-ray Disc™ or a Digital Versatile Disc (DVD). The Blu-ray Disc™, which uses a blue laser, is a high-density recordable disc that is able to record high-resolution data such as large volume movie content.

For many types of content, such as music data or video data, typically the distribution rights, or the like, are owned by the creator or the vendor. Consequently, when this type of content is provided to the user, there is typically a specific limit to its use. That is, the content is put into a form wherein use of the content is allowed only for authorized users. Specifically, control (e.g., an encoding process) is performed to prevent unauthorized reproduction. For example, the Blu-ray Disc™ has a standard wherein the content stored on the disc is divided into content control units (CPS units), and control is performed by each unit by corresponding usage control information ("usage rules"). Usage of content belonging to a single CPS unit is allowed within the scope established by the usage control information (usage rule) associated with the CPS unit to which that content belongs.

The usage control information (usage rule) is recorded on the disc along with the content. When content is read, the reading device reads out the usage control information associated with the CPS unit to which the read content belongs, and the content is used in accordance with the usage control information. The usage control information (usage rule) includes, for example, copy control information (CCI) for the content, and has information such as whether or not the content may be copied, and modes wherein use is or is not allowed.

When the content belonging to the CPS unit is encrypted content, then an association is made with a CPS unit key, which is an encryption key corresponding to the unit. When reading the encrypted content, a decoding process is performed using the CPS unit key. Note that a CPS unit key file, where the CPS unit key is stored, is also recorded on the disc. Content that is stored on a Blu-ray Disc™ is used and controlled under this type of strict usage control. Moreover, the Blu-ray Disc™ standard also regulates the use and control of data, as subsequential data, when downloading, from the server, adjunct data corresponding to the content recorded on the disc, such as subtitles or alternate soundtrack data, or other service data or video or still image content, or the like corresponding to the content.

Systems for using content wherein subsequential data is obtained from a server, or the like, to be recorded in a local storage unit, such as a hard disk, to be read along with the content that is stored on the disc are disclosed in, for example, Patent Reference 1 (Japanese Patent 3959735), and Patent Reference 2 (Japanese Unexamined Patent Application Publication 2003-140662). In the Blu-ray Disc™ standard it is a requirement that content information be recorded in a content certificate (CC) that certifies the validity of all content, whether recorded on a disc or downloaded, for any content that is subject to the usage control. The content certificate is a certificate to which the electronic signature of an AACS (Advanced Access Content System) server that performs AACS control, which is a content usage control standard, is applied corresponding to the content and also to the content usage control information (usage rules). The content certificate (CC) is stored on the disc, along with the content, as the certificate for the content that is stored on the disc.

In the conventional system, when subsequential data that has usage control information that is not recorded in the content certificate is obtained from a server for use, it is then necessary to perform a process to update the content certificate (CC). That is, it is necessary to request an update of the content certificate and request the establishment of a signature for the updated certificate by sending, to the AACS server, information regarding the existing content certificate and the newly acquired subsequential data. This type of content certificate updating process must be performed by either the server that provides the content or by the user device, but the process is time-consuming and costly, and the burden thereof is a major problem in subsequential data acquisition processes.

SUMMARY

The present invention is the result of contemplation on, for example, the situation described above, and the object thereof is to provide an information processing device, an information recording medium, and an information processing method and program capable of performing efficiently the tasks in the process of acquiring the subsequential data, wherein the content certificate updating process can be omitted, in a structure wherein subsequential data, such as data downloaded from a server or user-generated data that corresponds to content stored in media such as a DVD or a Blu-ray Disc™, or the like, is stored in local storage means, such as a hard disk, for use.

A first aspect of the present invention is in an information processing device comprising, a data processing unit for loading a disc whereon is stored content that is divided into units that are content usage control units and for executing content reading processes, and a local storage unit for storing subsequential data that is obtained or generated subsequentially, wherein the data processing unit is structured so as to perform processes for selecting, from dummy titles stored in advance on the disc, a title that is an index for specifying reading of the subsequential data, setting the title as a title for the subsequential data, and storing the subsequential data in a local storage unit.

In one form of embodiment of the information processing device as set forth in the present invention, the content stored on the disc has settings wherein an association is defined with usage control information, and the data processing unit sets, as a membership unit of the subsequential data, a unit that is associated with usage control information that matches the usage control status of the subsequential data.

In one embodiment of the information processing device as set forth in the present invention, the content stored on the disc has a setting wherein whether or not there is a correspondence to encrypted content is divided by said unit; wherein if the subsequential data is encrypted data, then a unit corresponding to encrypted content is set as a membership unit, and if the subsequential data is non-encrypted data, then a unit corresponding to non-encrypted content is set as a membership unit.

In one embodiment of the information processing device as set forth in the present invention, the data processing unit sets a membership unit of the subsequential data in accordance with unit specifying information received from the server that is the source that sends the subsequential data.

In one embodiment of the information processing device as set forth in the present invention, a dummy title that is recorded in advance on the disc has a structure that is set as a title that evokes a program for reading subsequential data, recorded on said disc, and the data processing unit, when reading the subsequential data, evokes a program for reading the subsequential data depending on the specification of a title that is set as a title for the subsequential data, to execute a process for reading subsequential data that is stored in the local storage unit.

In one embodiment of the information processing device as set forth in the present invention, the program for reading subsequential data is a program that is set to be evoked from different titles of a plurality of different units that are set on the disc, and the data processing unit evokes a program for reading the subsequential data, based on specifications of different titles of a plurality of different units, to execute a process for reading subsequential data.

In one embodiment of the information processing device as set forth in the present invention, the data processing unit performs a process for receiving, from the outside, an updating program for a program for reading subsequential data that is stored on the disc, and performs a process for storing in the local storage unit, to execute a process of storing the updated program for reading subsequential data, stored in the local storage unit, into the local storage unit as a setting that is evoked by the specification of the dummy title.

In one embodiment of the information processing device as set forth in the present invention, the data processing unit identifies a unit belonging to the content being read in the information processing device, and performs a read content limiting process that selects, as read-enabled content, only that subsequential data belonging to the same unit as the identified unit. Moreover, in another form of embodiment, when the data processing unit identifies a unit belonging to the content being read in the information processing device, and a user requests reading of subsequential data belonging to a unit other than the identified unit, a transition is performed to a title that is included within the unit to which the subsequential data for which the read has been requested belongs, and thereafter a read content limiting process that selects, as read-enabled content, is performed.

In one embodiment of the information processing device as set forth in the present invention, the data processing unit executes the read content limiting process in accordance with the program for reading the subsequential data.

In one embodiment of the information processing device as set forth in the present invention, the data processing unit performs the structuring of a virtual file system to perform parallel reading of content stored on the disc and subsequential data stored in the local storage unit.

In one embodiment of the information processing device as set forth in the present invention, when the data processing unit performs the structuring of a virtual file system, the filenames of the subsequential data stored in the local storage unit are converted in accordance with a file named conversion table.

Furthermore, a second aspect of the present invention is in an information recording medium whereon is stored data including stream data to be read and titles that are indexes for specifying content reading, divided into units as usage control units for the content, wherein the titles include dummy titles that are not set as indexes for reading stream data that has been recorded on the information recording medium, where the dummy titles are titles that can be set as indexes in association with subsequential data that is stored in a local storage unit of the information processing device after being acquired or generated subsequentially by the information processing device wherein the information recording medium is installed, enabling the reading, by an information processing device in which the information recording medium is installed, of subsequential data in response to a read instruction for a title that is associated with the subsequential data.

Furthermore, in one form of embodiment of the information recording medium as set forth in the present invention, usage control information for the unit is associated with content stored on the information recording medium, structured so that the dummy titles are set for each individual unit that is set in the information recording medium, where the selection of a title that is associated with subsequential data in the information recording device can be set to be selectable from dummy titles that belong to a unit that has usage control information matching the state of usage control of the subsequential data.

Furthermore, in one form of embodiment of the information recording medium as set forth in the present invention, a program for reading subsequential data that is evoked by a dummy title that is recorded is stored in advance on the information recording medium; and the information processing device, when reading the subsequential data, evokes a program for reading the subsequential data in response to the specification of a title that is set as a title for the subsequential data, to execute a process for reading subsequential data that is stored in the local storage unit.

Furthermore, in one form of embodiment of the information recording medium as set forth in the present invention, the program for reading the subsequential data is a program set to be evoked by different titles of a plurality of different units that are set in the information recording medium.

Furthermore, a third aspect of the present invention is in an information processing method comprising a subsequential data acquiring step wherein a data processing unit loads a disc whereon is stored content that is divided into units that are content usage control units and wherein data is obtained or generated subsequently in an information processing device, a title setting step wherein the data processing unit selects, from dummy titles stored in advance on the disc, a title that is an index for specifying reading of the subsequential data, and sets the title as a title for the subsequential data, and a subsequential data storing step for storing the subsequential data in a local storage unit.

Furthermore, a fourth aspect of the present invention is in a program for performing processes for controlling subsequential data in an information processing device, comprising a subsequential data acquiring step wherein a disc whereon is stored content that is divided into units that are content usage control units is loaded into a data processing unit, and wherein data is obtained or generated subsequently in an information processing device, a title setting step wherein the data processing unit selects, from dummy titles stored in advance on the disc, a title that is an index for specifying reading of the subsequential data, and sets the title as a title for the subsequential data, and a subsequential data storing step for storing the subsequential data in a local storage unit.

Note that the program as set forth in the present invention is a computer program that can be provided to a general-use computer system that can execute, for example, various program codes, provided via a recording medium that is provided in a computer-readable format or via a communications medium. Processing can be achieved on the computer system in accordance with the program by providing this type of program in a computer-readable format.

Yet other objects, features, and benefits of the present invention will be understood through the detailed explanation of the present invention, below, based on examples of embodiment of the present invention and on the appended drawings. Note that in the present specification, "the system" is a logical collective structure of a plurality of devices, and is not limited to each structural device being within the same frame.

Given the structure, in one example of embodiment of the present invention, when subsequential data that is obtained or generated subsequentially as data corresponding to content that is stored on a disc, such as a DVD, is stored in a local storage unit, such as a hard disk, a title, which is an index for specifying the reading of the subsequential data, is selected from dummy titles that are stored on the disc in advance, is set as the title for the subsequential data, and is stored in the local storage unit. Given this structure, it is possible to store subsequential data without changing the correspondence relationship between the titles and the CPS units, which are the units for controlling the content recorded on a disc. The result is that it is possible to perform recording and usage processes of the subsequential data without updating the content certificates (CC).

BRIEF DESCRIPTION OF THE DRAWINGS

FIG. 4 is a diagram for explaining an example of a specific structure for a CPS unit key file.

FIG. 7 is a diagram for explaining the correspondence between the CPS units, the titles, and the usage control information (usage rules) in accordance with the present invention.

FIG. 19 is a diagram for explaining an example of a file [name?] conversion table that is stored in subsequential data searching information.

DETAILED DESCRIPTION

Certain embodiments as disclosed herein provide for information processing device, information recording medium, and information processing method and program which efficiently process and acquire subsequential data, wherein a content certificate updating process can be omitted. The information processing device, information recording medium, and information processing method and program as set forth in the present invention will be described below in reference to the figures. The explanations will be made in accordance with the following items:

1. Overview of Structure and Processes in the Information Processing Device.

2. Examples of Settings and Processes for Titles for the Information Recording Medium According to the Present Invention.

1. Overview of Structure and Processes in the Information Processing Device

Figure 1:
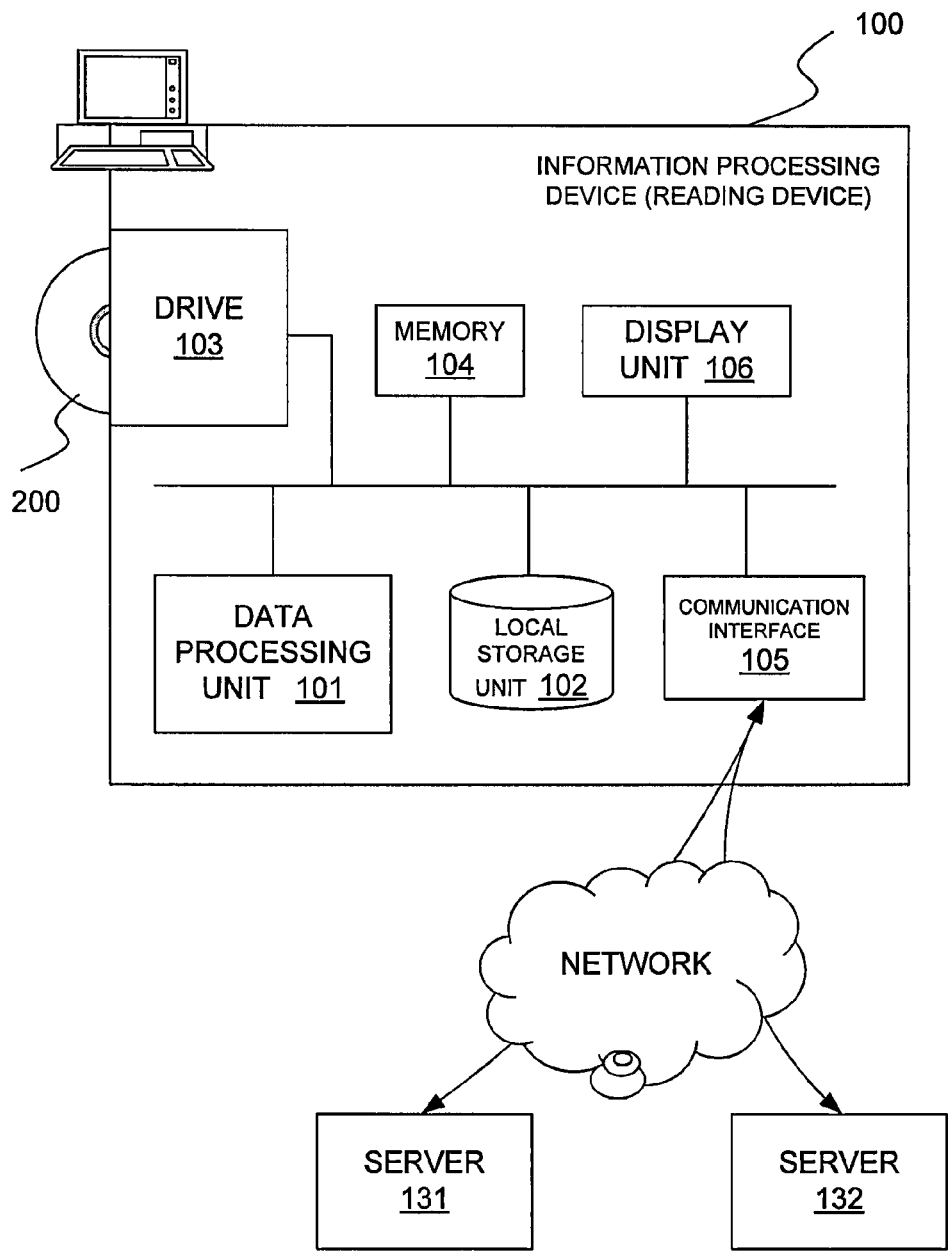
FIG. 1 is a diagram for explaining a structure of an information processing system according to one example of embodiment as set forth in the present invention.

An explanation will be given first regarding an overview of the structure and processes in an information processing device according to one example of embodiment as set forth in the present invention. FIG. 1 is a diagram illustrating an information processing device 100 of a PC or a reading device, for example, that performs the process of reading an information recording medium (disc) 200 that is, for example, a DVD or a Blu-ray Disc™.

The information processing device 100 has the following structures: a data processing unit 101 that has a program executing function, such as a CPU that executes content reading processes and subsequential data control processes; a local storage unit 102 for storing control data and subsequential data such as data that has been generated by the user and data that has been downloaded from servers 131 and 132, as data corresponding to content that is stored on an information recording medium 200; a drive 103 for performing data input and output relative to the information recording medium 200; a memory 104 comprising a ROM and/or RAM used in a program executing area and a parameter storing area, and the like; a communication interface 105 for performing communication through a network; and a display unit 106 for performing the content and content information display; wherein the local storage unit 102 is structured from, for example, a hard disk or a flash memory, or the like. Note that when the information recording medium 200 is structured having a recordable data area (such as an R-type medium, and RE-type medium, a partial ROM, or the like), for example, the structure may be one wherein a portion of the information recording medium 200 may be used as the local storage unit.

The information processing device 100 reads in the content stored on the information recording medium 200 through the drive 103 to perform a content reading process. This process is performed under the control of a data processing unit 101. The information recording medium 200 may be, for example, ROM media wherein the content is prerecorded, or a data-writable R-type or RE-type medium wherein content obtained by the user through a process such as downloading from a server can be recorded.

The information processing device 100 acquires through the servers 131 132, and records to the local storage unit 102, which comprises, for example, a hard disk or a flash memory, or the like, content that can be used in conjunction when reading out the content that is stored on the information recording medium 200, such as, for example, subtitle data or alternate soundtrack data if the content that is stored on the information recording medium 200 is movie content, or, for example, service data corresponding to the content that is stored on the information recording medium 200. Furthermore, if the content that is stored in the information recording medium 200 is a game program, then score information, history information, and other subsequential data that is obtained through executing the game is stored in the local storage unit 102.

The data that is stored in the local storage unit 102 is, for example, data that is acquired or generated corresponding to any of the content that is stored in the information recording medium 200, and at the time of a process of reading out the content that is stored in the information recording medium 200, the subsequential data that is stored in the local storage unit 102 and selected by the user can be read in conjunction. In this reading process, a VFS (virtual file system) is constructed that combines the content that is stored on, for example, a disc, with content that is stored in the local storage unit, such as a hard disk, and the reading process is performed. This reading process based on a VFS makes it possible to perform the reading process in the same way as a reading process from a single medium. The reading process based on VFS will be described in detail in a later stage.

When recording subsequential data, the data processing unit 101 generates or updates control information or explanatory information regarding the subsequential data, as necessary, and stores this information in the local storage unit 102.

The data processing unit 101 records the subsequential data and control information and/or explanatory information into a subsequential data directory that is established in the local storage unit 102.

The data processing unit 101 controls the subsequential data by a control unit known as a binding unit (BU). The control unit (BU) is established as a unit that includes subsequential data, such as content downloaded from a server or user-generated data that is generated or acquired subsequently corresponding to content that is stored in the information recording medium 200. The majority of the subsequential data is data that can be read and used in conjunction with reading of the content that is stored in the information recording medium 200.

When reading subsequential data that is stored in the local storage unit 102 in conjunction with the content that is stored in the information recording medium (disc) 200, the data processing unit 101 constructs the VFS (virtual file system) and then performs the reading process, as described above, and at this time, the data processing unit 101 performs a filename conversion process for the subsequential data that is stored in the local storage unit 102. The table that is applied to this conversion process is known as a filename conversion table (manifest file (BUMF)). The manifest file stores subsequential data control information by the control unit (binding unit (BU)) unit, and is also known as a "binding unit manifest file (BUMF)."

Further, a single manifest file (BUMF) is established for a single control unit (BU), the control information for a plurality of control units may conversely be stored in a single manifest file (BUMF). Specific examples of manifest files (BUMF), and examples of use thereof, will be explained in a later stage.

Figure 2:
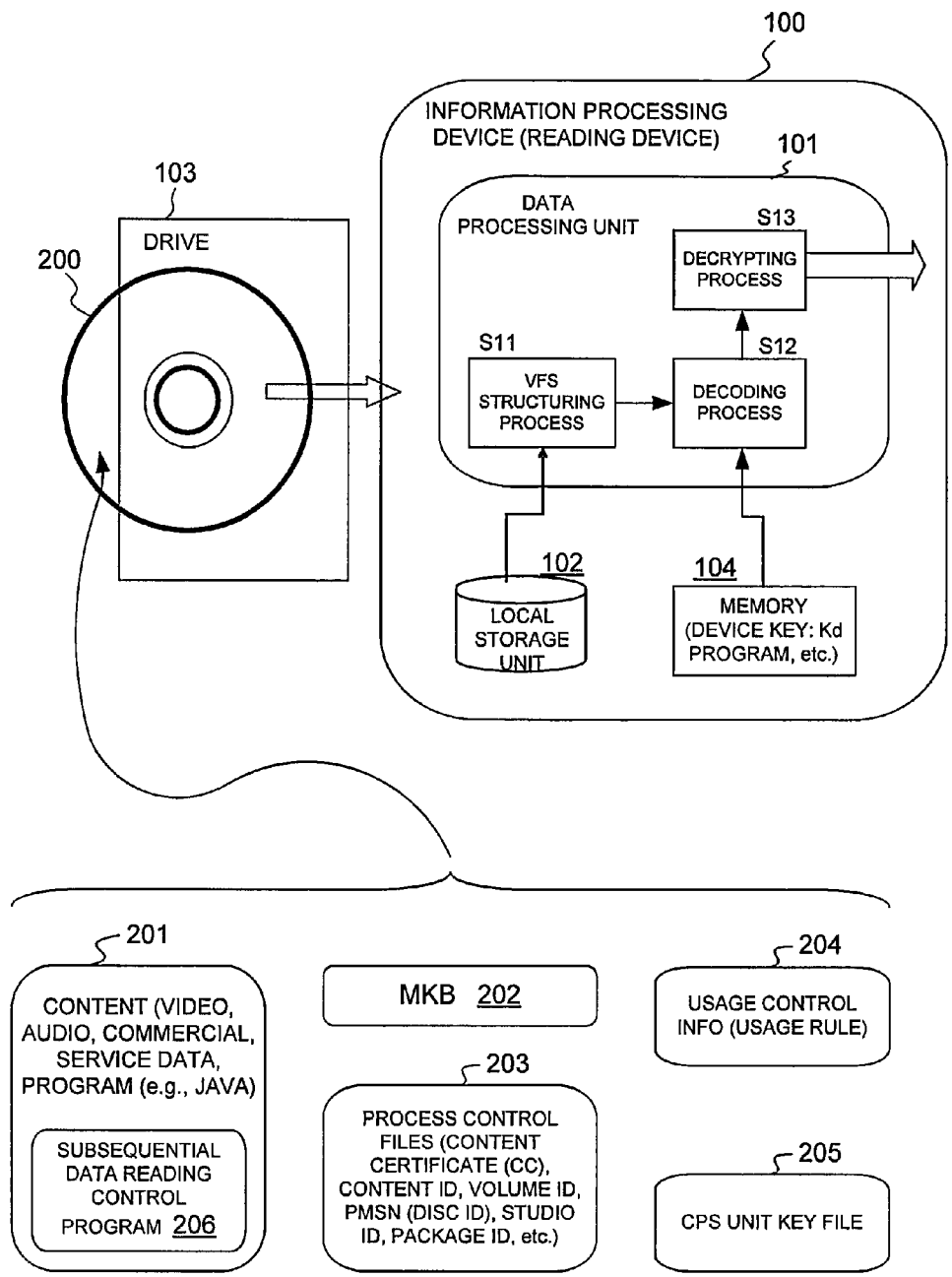
FIG. 2 is a diagram illustrating data stored in an information recording medium and a content reading process in an information processing device (reading device).

An example of data that is stored in the information recording medium and an example of a content reading process in the information processing device will be explained next in reference to FIG. 2 and FIG. 3. FIG. 2 is a diagram illustrating data stored in the information recording medium 200 and a content reading process in the information processing device (reading device) 100. An example is shown here wherein information has been stored on a ROM disc, as the disc wherein content has been stored. The information processing device 100 may be of a variety of information processing devices, such as a PC or a dedicated player device, and possesses a drive 103 for executing the process of reading data from the information recording medium 200.

The ROM disc, as the information recording medium (disc) 200 may be, for example, an information recording medium such as a Blu-ray Disc™ or a DVD, and is an information recording medium wherein is stored legal content, manufactured in, for example, a disc manufacturing factory under the authority of the owner of the legal rights to the content.

As is shown in FIG. 2, content 201 on the information recording medium (disc) 200 includes: an MKB (Media Key Block) 202, as an encryption key block that is generated based on a hierarchical key distribution method that is well-known as one type of broadcast encryption method; a process control file 203 that includes a content certificate (CC) for proving the legality of the content, etc., that is stored in the information recording medium 200; a content ID as a content identifier, a volume ID that is established as an identifier for each individual information recording medium or for each group of a predetermined number of information recording media; a PMSN (Prerecorded Media Serial Number) that corresponds to a media ID as identification information that is unique to the disc, and so forth; usage control information (usage rules)

204 that include, for example, CCI (Copy Control Information) as content copy/read control information; and a CPS unit key file 205 wherein is stored a CPS unit key that is an encryption key that is established for each individual content control unit (CPS unit) as the unit for content usage control; wherein these data are all stored thereon.

Note that in the present example, a subsequential data reading control program 206 is included, in the content 201, as program information that is applied to the process of downloading content from a server, described below. The subsequential data reading program is a program that is structured from, for example, a Java™ application, and is also known as a BD-J application. An example of the process wherein the subsequential data reading control program 206 is used will be described at a later stage. An overview of the information that is stored on the information recording medium 200 will be explained below.

(1) The Content 201

A variety of content is stored on the information recording medium (disc) 200. For example, content such as an AV (AudioVisual) stream of movie content, such as HD (High-Definition) movie content, or a game program, an image file, audio data, text data, a Java™ application program, or the like.

Of these contents, the main content, such as movie content, is data stored in a specific AV format, and is recorded as data that is encrypted following the AACS (Advanced Access Content System) standard, which is a standard for a content copyright protection technology. That is, the content is divided into units (CPS units) and recorded onto the disc as encrypted content to which unit keys (CPS unit keys) corresponding to each unit are applied. Details regarding the recording format for the content will be explained in a later stage in reference to FIG. 3.

This content 201 further includes Java™ application programs, game programs, graphics files, audio data, text data, and so forth stored as subcontent. In some cases, the subcontent is data that does not follow the AV data format.

Both the main content and the subcontent include, as types of content, a variety of content such as audio data, movies, graphic data such as still images, game programs, Web content, and the like, where these contents include a variety of types of information including content information that can be used exclusively by data from the information recording medium 200, content information wherein data from the information recording medium 200 can be used in conjunction with data that is provided from a server that is connected to a network, and so forth.

(2) The MKB

The MKB (Media Key Block) 202 is an encryption key block that is generated based on a hierarchical key distribution method that is well-known as one type of broadcast encryption method. The MKB 202 is a key information block that enables the acquisition of the media key (Km) that is required for decrypting the content through a process (decryption) that is based only on a device key (Kd) that is stored in a user information processing device that has a valid license. This is an application of an information distribution method that follows a hierarchical tree-structure, which enables the acquisition of the media key (Km) only when the user device (the information processing device) has a valid license, where the media key (Km) cannot be acquired in a user device that has been invalidated (through a revocation process).

The control center that performs the control of the MKB is able to generate, through changing the device key that is used in encrypting the key information, an MKB that has a structure wherein decoding is not possible using the device key that is stored in a particular user device, or in other words, wherein the media key that is required for content decryption cannot be acquired. Consequently, an illegal device can be excluded (revoked) at any given time, enabling the provision of decryptable encrypted content to only those devices that have valid licenses.

(3) The Process Control File

The process control file 203 includes, for example, the following data: a content certificate (CC) that is a certificate for proving the legitimacy of the content that is stored on the disc; a content ID as an identifier for the content that is stored on the information recording medium 200; a volume ID that is established as an identifier for each individual information recording medium or for each group of a predetermined number of information recording media; and a PMSN (Prerecorded Media Serial Number) that corresponds to a media ID as identification information that is unique to the disc. In addition to these, a disc ID is included as identification information for the information recording medium 200, a studio ID is included as an identifier of the studio that edited the content stored in the information recording medium 200, and a package ID is included as a package identifier, as the unit by which the information recording medium 200 is manufactured. Note that the package ID is sometimes termed a "disc ID."

In the Blu-ray Disc™ standard it is a requirement that content information be recorded in a content certificate (CC) that certifies the validity of content recorded on a disc, for content that is subject to the usage control. The content certificate (CC) validation is performed prior to the commencement of reading, so the subsequential data is outside of the scope of the content certificate (CC) validation process.

Specifically, the content certificate (CC) records a list of the hash values of the usage control information (usage rules) of the CPS units recorded on the disc or the CPS units added through downloading, and the hash values of the clip AV stream files. The information processing device that performs the reading process uses the content certificate (CC) to confirm that the content to be read is valid data that has been recorded and the content can only be read if that confirmation is successful. Note that the content certificate (CC) is a certificate that has the electronic signature of the AACS server that performs the control of the AACS (Advanced Access Content System), which is a content usage control standard, and an update of the electronic signature of the AACS server is required when there is a process to update the certificate. When the content certificate (CC) is used, the electronic signature is verified to confirm that the certificate is valid.

(4) Usage Control Information (Usage Rules)

The usage control information (usage rules) 204 includes, for example, copy/read control information (CCI). That is, this is information for controlling copying or information for controlling reading for usage control, the corresponding to the encrypted content 201 that is stored on the information recording medium 200, the content that is acquired subsequentially from a server, or the like. This copy/read control information (CCI) can be provided in a variety of ways, such as being provided as information for individual CPS units that are established as content control units, or being provided corresponding to a plurality of CPS units.

(5) The CPS Unit Key File

The encrypted content that is stored in the information recording medium 200 is, as described above, divided into CPS units that are established as content control units, and encrypted using the encryption keys for the individual units. The information processing device that performs the reading process must identify the CPS to which the content to be read belongs, and must perform the decryption process using the CPS unit key as the decryption key that corresponds to the identified CPS unit. The file that stores the data that is required in order to obtain this CPS unit key is the CPS unit key file. Note that when reading content, it is necessary to apply not just the CPS unit key, but also a variety of other key information, key generating information, and the like.

FIG. 2 illustrates the detail of the data that is stored on the information recording medium 200, and illustrates schematically the process in the information processing device 100 for reading the content that is stored on the information recording medium 200 in conjunction with the content that is stored in the local storage unit 102, such as content that is acquired from a server subsequentially. This information processing device has a drive 103 for performing a process for reading the data that is stored on the information recording medium.

First, in Step S11, the data processing unit 101 of the information processing device 100 performs the process of structuring a VFS (virtual file system). That is, a VFS (virtual file system) is structured combining the content that is stored on the information recording medium (disc) 200 and the content that is stored in the local storage unit 102, such as a hard disk, or the like. This reading process based on a VFS makes it possible to perform the reading process in the same way as a reading process from a single medium. Thereafter, in Step S12 through S13, the content is read through performing a content decryption process and performing a decoding process (such as MPEG decoding).

The memory 104 is a memory that is structured from ROM [and/or] RAM used in a program executing area and a parameter storing area, and the like, and stores the device key (Kd) that is applied to the content decrypting process, the program that performs the various processes, and so forth. When decrypting the content, the information processing device 100 generates a key to be applied to the decryption of the content based on data stored in this memory 104 and data read from the information recording medium 200, and performs a decryption process on the encrypted content to be read.

An example of the format of the content that is stored on the information recording medium will be explained next in reference to FIG. 3. At least a portion of the content that is stored on the information recording medium is stored after an encryption process is performed after the assignment of keys that are different for each individual unit, in order to achieve usage control that is different for each unit. That is, the content is divided into content control units (CPS units) and encryption processes are performed on each, to perform usage control for each.

When using content, such as reading encrypted content, it is necessary to obtain the CPS unit keys that are assigned to each unit first, after which the reading is performed through applying the other necessary keys and key generating information, and performing data processing based on a predetermined decryption processing sequence. Forms, wherein the content control unit (CPS unit), are provided will be explained in reference to FIG. 3.

Figure 3:
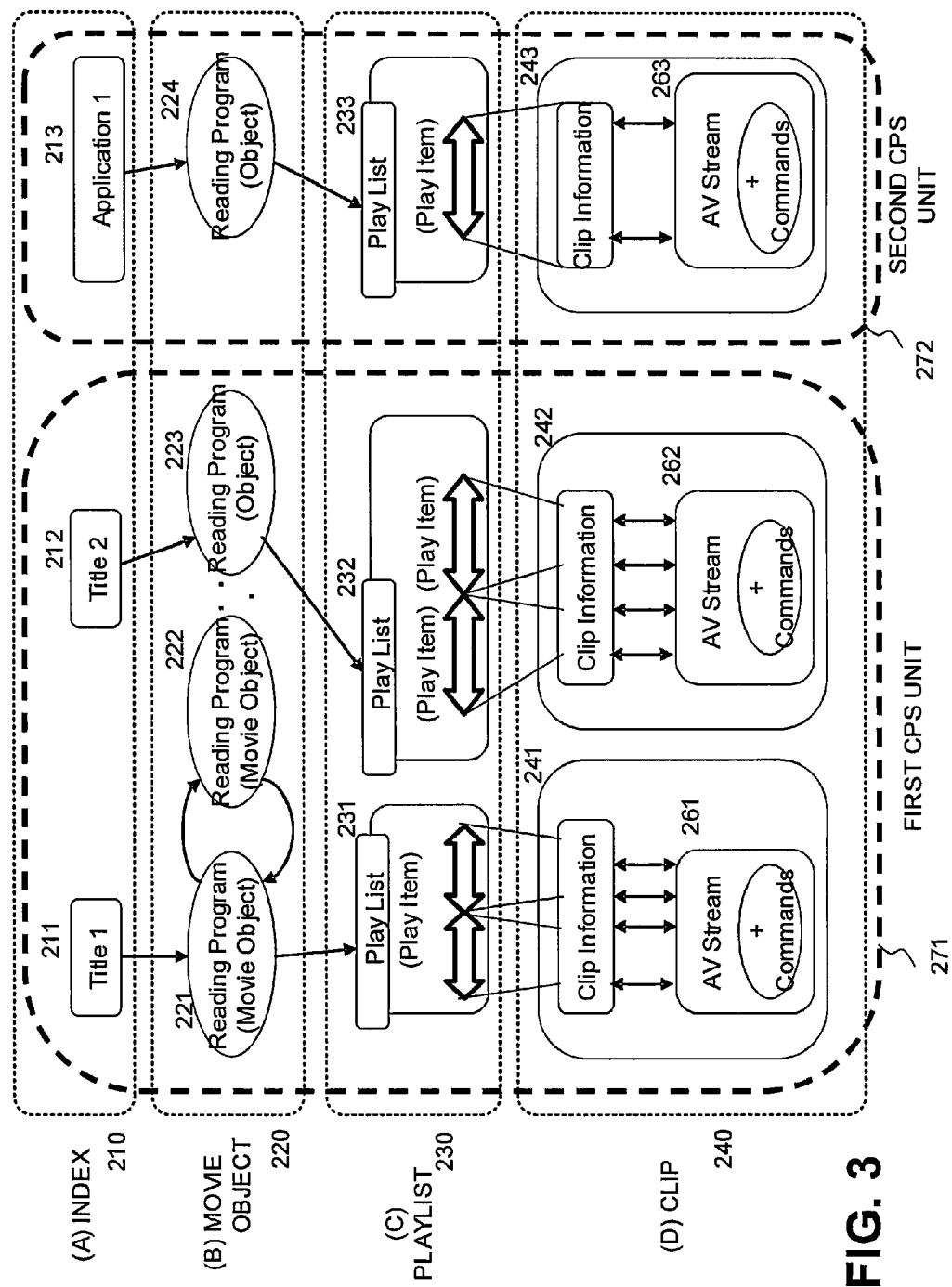
FIG. 3 is a diagram for explaining an example of a format for content that is stored on an information recording medium.

As a shown in FIG. 3, the content has a hierarchical structure of (A) an index 210, (B) a movie object 220, (C) a play list 230, and (D) a clip 240. When an index is specified, such as a title to be accessed by a reading application, the reading program that is associated with the title, for example, is specified, and, in accordance with the program information for the specified reading program, a play list is selected that specifies the sequence of reading the content.

The play list includes play items that are information specifying the data to be read. Depending on the clip information, as the segments to be read, specified by the play items that are included in the play list, the AV stream and commands, and the like, are read selectively as the actual content data, and processes are performed to read the AV stream and execute the commands. Note that there are pluralities of play lists and play items, and each is associated with a play list ID and play item ID, respectively, as identification information.

Note that the format illustrated in FIG. 3 is a format for content encrypted in accordance with the AACS standard, and not all of the content 201 that is stored on the disc is necessarily data in accordance with this format. Commercial content, service content, Java™ program content, and other content may also be stored on the disc in addition to the encrypted data that is stored in accordance with this format. These contents may also be recorded on the disc as non-encrypted content, and play lists may be used in reading this type of content as well.

That is, while the provision of the play list illustrated in FIG. 3 illustrates an example of a play list that specifies reading of only AV streams that are all encrypted data, it is also possible to provide, in addition thereto, play lists for using AV streams following the AACS standard, and for reading content as non-encrypted data. Note that when reading content, the content is read after the user specifies the title; however, one or more content to be read can be selected and read sequentially by a selected play list by a reading program being selected through the specification of the title by the user, and the play list being selected by that reading program.

FIG. 3 illustrates two CPS units in encrypted content that is included in the content 201 that is recorded on the disc 200. These constitute a portion of the content that is stored on the information recording medium. The first CPS unit 271 and the second CPS unit 272 are each a CPS unit that is established as a unit that includes a title as the index, a movie object as the reading program file, a play list, and a clip that includes an AV stream file as the data of the actual content.

The first content control unit (CPS unit) 271 includes a first title 211, a second title 212, the reading programs 221 and 222, the play lists 231 and 232, the clip 241, and the clip 242, where the AV stream data files 261 and 262 that are the data of the actual contents that are included in the two clips 241 and 242 are data that is subjected to, at least, encryption, where, in principle, this is data that is encrypted through the use of the CPS unit key (Ku1) that is the encryption key that is established associated with the first content control unit (CPS unit) 271.

The second content control unit (CPS unit) 272 includes, as the index, a first application 213, the reading program 224, the play list 233, and the clip 243, where the AV stream data file 263 that is the data of the actual content that is included in the clip 243 is encrypted through the use of the CPS unit key (Ku2) that is an encryption key that is the encryption key that is established associated with the second content control unit (CPS unit) 272.

For example, in order for the user to execute the application file or the content reading process corresponding to the first content control unit 271, it is necessary to execute the decryption process after acquiring the unit key Ku1 as the encryption key that is established in association with the first content control unit (CPS unit) 271. In order to execute the application file or the content reading process corresponding to the second content control unit 272, it is necessary to execute the decryption process after acquiring the unit key Ku2 as the encryption key that is established in association with the second content control unit (CPS unit) 272.

An example of a specific structure for a CPS unit key file is illustrated in FIG. 4. FIG. 4 is a diagram that illustrates the structure of the CPS unit key file as a table. As a shown in FIG. 4, the CPS unit key file is partitioned for each index information, such as a title, and has a data structure wherein a decrypted CPS unit key (Kun) is associated with a content control unit number (CPS unit number) that is associated with each index.

The information processing device that performs the reading of the content performs the decryption process for the CPS unit, which is the encrypted content, after acquiring the corresponding CPS unit key based on the unit number (the CPS unit number) that is established in the individual CPS unit.

2. Examples of Settings and Processes for Titles for the Information Recording Medium According to the Present Invention As is already been explained, in the Blu-ray Disc™ standard it is a requirement that the content information be recorded a on a content certificate (CC) for content that is subject to usage control and that is to be read by the user reading device. That is, it is necessary to store a content certificate (CC) certifying the validity of all of the content, whether it is content that is recorded on the disc or subsequential data such as content that has been downloaded. Specifically, the content certificate (CC) records correspondence relationship information for, for example, the CPS units recorded on the disc and the titles used as indexes for the content within the CPS units.

The information processing device that performs the reading process confirms that the hash value of the content to be read has been recorded in the content certificate (CC), and the content can only be read if that confirmation is successful. The content certificate (CC) is a certificate, to which the AACS server electronic signature is applied, issued by an AACS server which executes the AACS (Advanced Access Content System) content usage control standard. When the content certificate (CC) is used, the electronic signature is verified to confirm that the certificate is valid.

When a CPS unit that is not recorded in the content certificate is obtained from a server for use, it is then necessary to perform a process to update the content certificate (CC). In this case, it is necessary to request an update of the content certificate and request the establishment of a signature for the updated certificate by sending the existing content certificate and the subsequential data to the AACS server. This type of content certificate updating process is a process that is time-consuming and costly, and executing this type of content certificate (CC) updating process on the user device, or on the content server that provides the content, is problematic in terms of both time and expense.

The content certificate must be updated when there is a discrepancy between the recorded content of the content certificate and the content to be read. That is, a content certificate updating process is necessary when content that is not recorded in the content certificate is obtained later. Specifically, a content certificate (CC) updating process is necessary when there is a change in the correspondence relationship between the CPS units and the titles that are used as indexes when reading the content.

In the AACS standard, usage control is performed by the CPS unit, as already explained, and there is usage control information that is specified corresponding to each CPS units. As explained above in reference to FIG. 3, a title is set as index information in the CPS unit, and the user starts the reading of the content by specifying the title. By specifying the title, usage control is performed in accordance with the usage control information corresponding to the CPS unit belonging to that title.

In a conventional information recording medium (disc), the title that is set in the CPS unit is set corresponding to only that content that has been recorded in the information recording medium (disc). That is, no title is set that is not associated with read content.

For example, titles have not been set for application to reading of content that is obtained subsequentially from the server. Consequently, when subsequential data is obtained from a server through, for example, downloading, either a new CPS unit wherein a title that is applied to reading the subsequential data is set, or a process is performed to set a new title that corresponds to a specific existing CPS unit. When setting this type of title or when performing a process for adding a CPS unit, this causes a change in the initial correspondence relationship between the CPS units and titles, requiring a process for updating the content certificate (CC).

The information recording medium as set forth in the present example of embodiment according to the present invention provides in advance, as dummy titles for each of the CPS units, titles for content that is not recorded in advance on the disc, or in other words, content to be obtained subsequentially through a downloading process, or the like. These titles are set as titles for executing a reading control program for subsequential data. A disc whereon dummy titles of this type are set is provided to the user, and if the user obtains subsequential data at some future date, the dummy title correspondence is set as the index for reading the subsequential data.

This type of structure enables the selection and setting of the title for the subsequential data from the dummy titles, without changing the relationships between each of the CPS units and the titles set for each of the CPS units such as a correspondence between CPS units and titles wherein CPS unit 1=titles 1 through 200, CPS unit 2=titles 201 through 300, and CPS unit 3=titles 301 through 400. Setting in this way makes it possible to use and control the subsequential data without updating the content certificates (CC).

Figure 5:
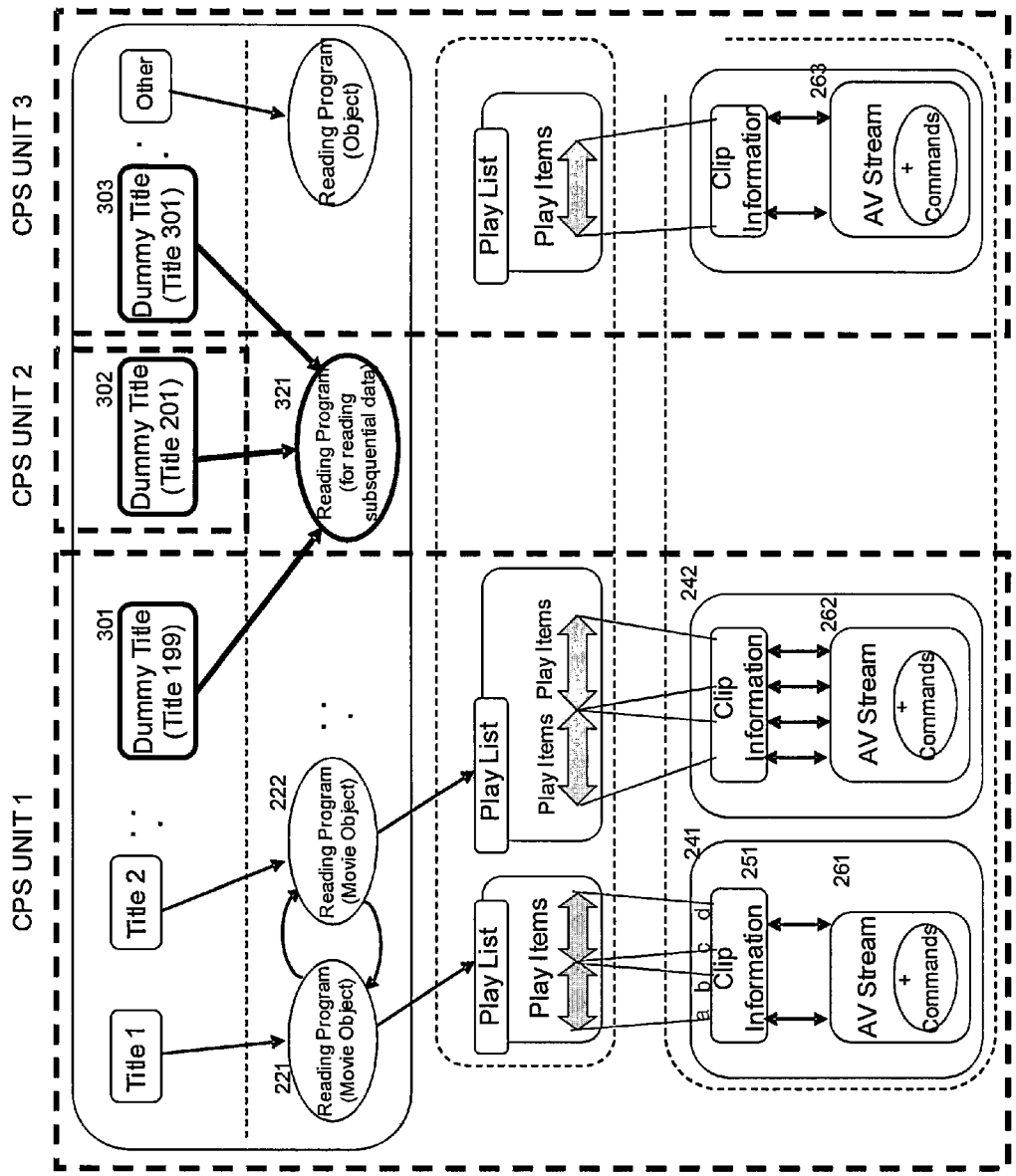
FIG. 5 is a diagram for explaining a specific example of files set in an information recording medium as set forth in the present invention.

A specific example of setting titles is illustrated in FIG. 5. The format illustrated in FIG. 5 is similar to the format explained above in reference to FIG. 3, where the content has a hierarchical structure of (A) an index 210, (B) a movie object 220, (C) a play list 230, and (D) a clip 240. When an index is specified, such as a title to be accessed by a reading application, the reading program that is associated with the title, for example, is specified, and, in accordance with the program information for the specified reading program, a play list is selected that specifies the sequence of reading the content.

The information recording medium according to the present invention provides in advance titles (dummy titles) for each of the CPS units for content that is not recorded in advance on the disc, or in other words, content to be obtained subsequentially through a downloading process, or the like. These are the dummy title 301 (title 199) of the CPS unit 1, the dummy title 302 (201) of the CPS unit 2, and the dummy title 303 (title 301) of the CPS unit 3, illustrated in FIG. 5.

Furthermore, a subsequential data reading program 321 for performing the reading process through these dummy titles 301 through 303 is also recorded in advance on the information recording medium. This reading program is structured from, for example, a Java™ program (known as a BDJ application), and can be updated by downloading from a server.

In this way, titles (dummy titles) for content to be obtained subsequentially are set in each CPS, and content certificates (CC) including the title information are set and are recorded to the disc. Content obtained from the server subsequentially is caused to be associated with a dummy title. It is possible to read the subsequential data by executing the subsequential data reading program 321 by specifying the dummy title.

Note that the reason why the respective dummy titles are set in each CPS unit is to associate different usage control information by the CPS unit. For example, the CPS unit 1 may be set to have copy-prohibited content while the CPS unit 2 may be set to have copy-allowed content.

When setting in this way, the information processing device that performs the downloading of the subsequential data performs a process to associate the downloaded content with the dummy title that is set for the CPS unit 1 if the downloaded content is copy-prohibited content. If the downloaded content is copy-allowed content, then a process is performed to associate the downloaded content with the dummy title that is set for the CPS unit 2.

Figure 6:
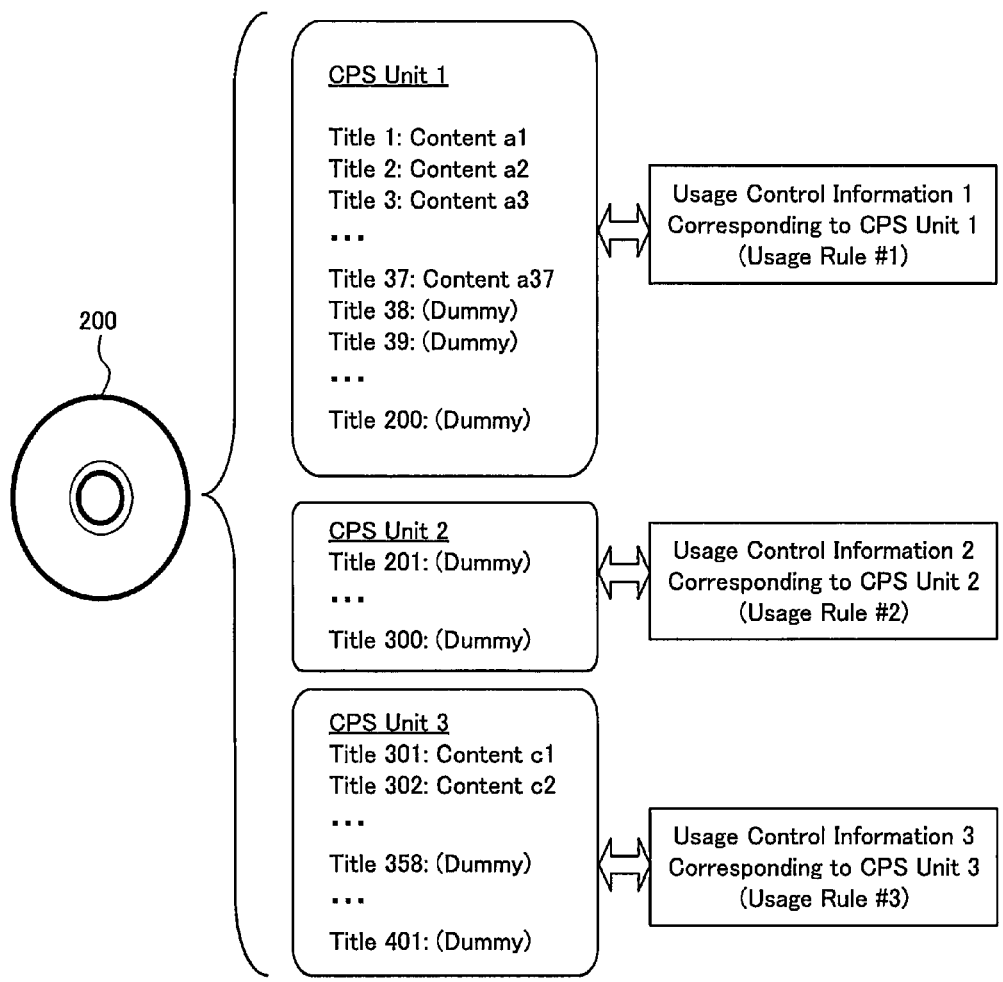
FIG. 6 is a diagram for explaining the correspondence between the CPS units, the titles, and the usage control information (usage rules) in accordance with the present invention.

An example of the correspondence between the CPS units, the titles, and the usage control information (usage rules) in accordance with the present invention will be explained in reference to FIG. 6. The information recording medium as set forth in the present invention, as shown in FIG. 6, has a plurality of CPS units (CPS units 1 through 3) defined in the disc 200, where usage control information (usage rules #1 through #3) are specified and stored in correspondence with each of the units. When using, such as reading, the content belonging to the CPS unit 1, the usage control is executed in accordance with the specification of the usage control information 1 (usage rule #1).

A title to be used as the index for reading the content is set for each of the CPS units. In the titles set in the CPS there are titles set that are associated with content that is recorded on the disc, as the read contents, and titles (dummy titles) set that are not associated with content recorded on the disc. Note that only dummy titles are set for the CPS unit 2. These dummy titles are titles that can be used as indexes for reading subsequential data.

In this way, the information recording medium (disc) as set forth in the present invention has a dummy title wherein no content that is recorded in advance of the disc is set as the read content is set for each CPS unit, said so as to enable the creation of an association, when subsequential data is obtained, with the obtained content as the read content.

A more detailed example of setting titles is illustrated in FIG. 7. Beginning on the left in Table 7, there are titles, CPS units, encryption/non-encryption, use control information, explanations (notes), files that are established in disc 1, and files that are established in disc 2, and the correspondence data related thereto are illustrated. Each CPS unit 1 through 4 is given different usage control information, and whether or not there is encryption is set for each individually as well. For example, in the CPS unit 1, titles 181 through 200 are set as the dummy titles for subsequential data. That is, usage control information, such as copy-prohibited and copy-free is set in the disc 1, as dummy CPS units that have been set, even regarding titles that do not exist on disc 1 but that might be added in the future as subsequential data, and when subsequential data that requires the setting of specific usage control information has been obtained, it is controlled by the application of one of these dummy CPS units, to eliminate the need for updating the usage control information that exists on the disc, and, as a result, eliminating the need for the work of updating the content certificates that exist on the disc.

Figure 8:
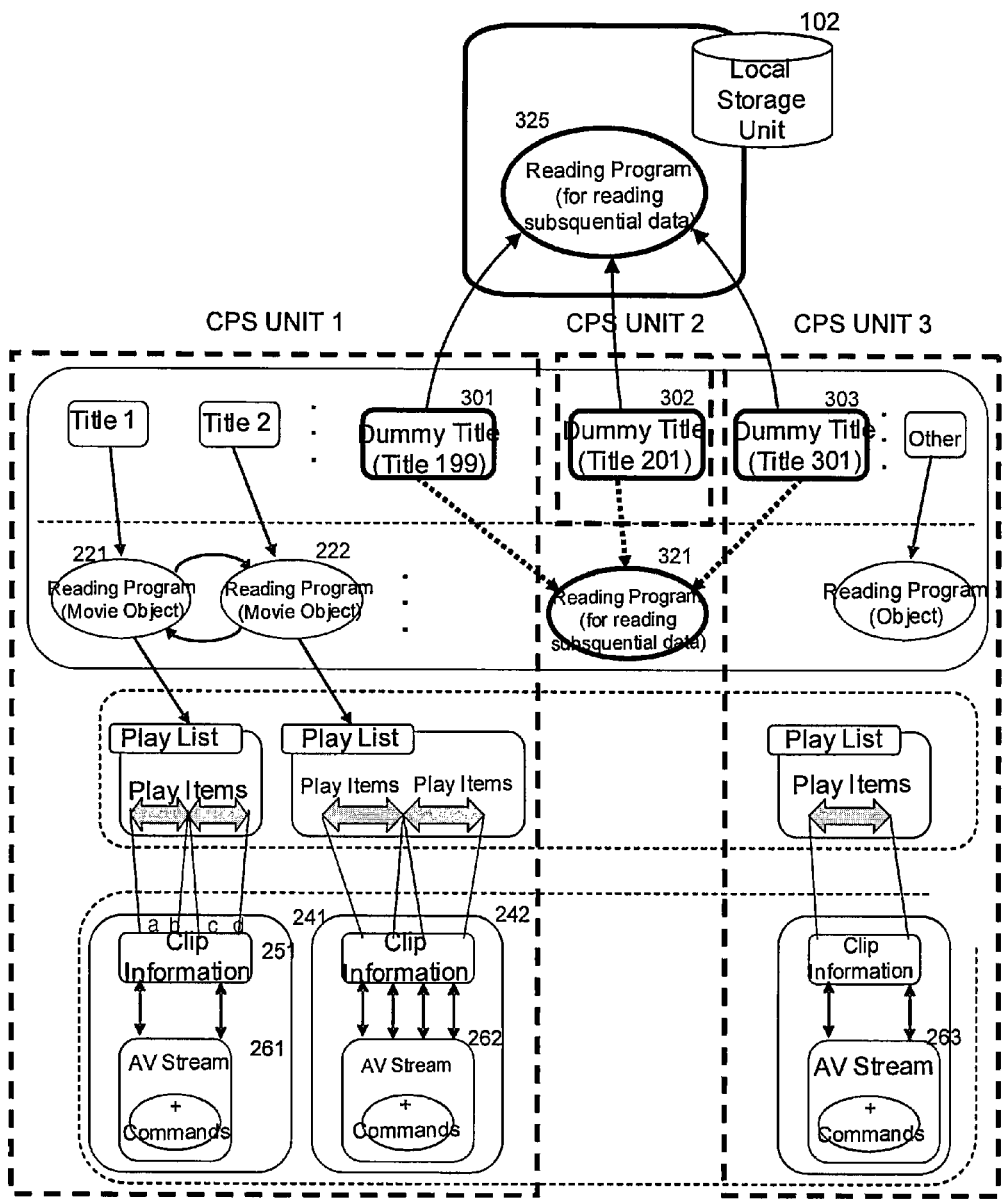
FIG. 8 is a diagram for explaining an example of a case wherein a process for updating the subsequential data reading program, which performs the reading process, is performed through dummy titles.

FIG. 8 is a diagram for explaining an example of a case wherein a process for updating the subsequential data reading program 321, which performs the reading process, is performed through the dummy titles 301 through 303. When the subsequential data reading program 321 that is recorded in advance on the information recording medium (disc) is updated through downloading from the server, the subsequential data reading program 325, which is the updated program, is stored in the local storage unit 102. This updated subsequential data reading program 325 is used when performing the content reading process through dummy titles 301 through 303.

Figure 9:
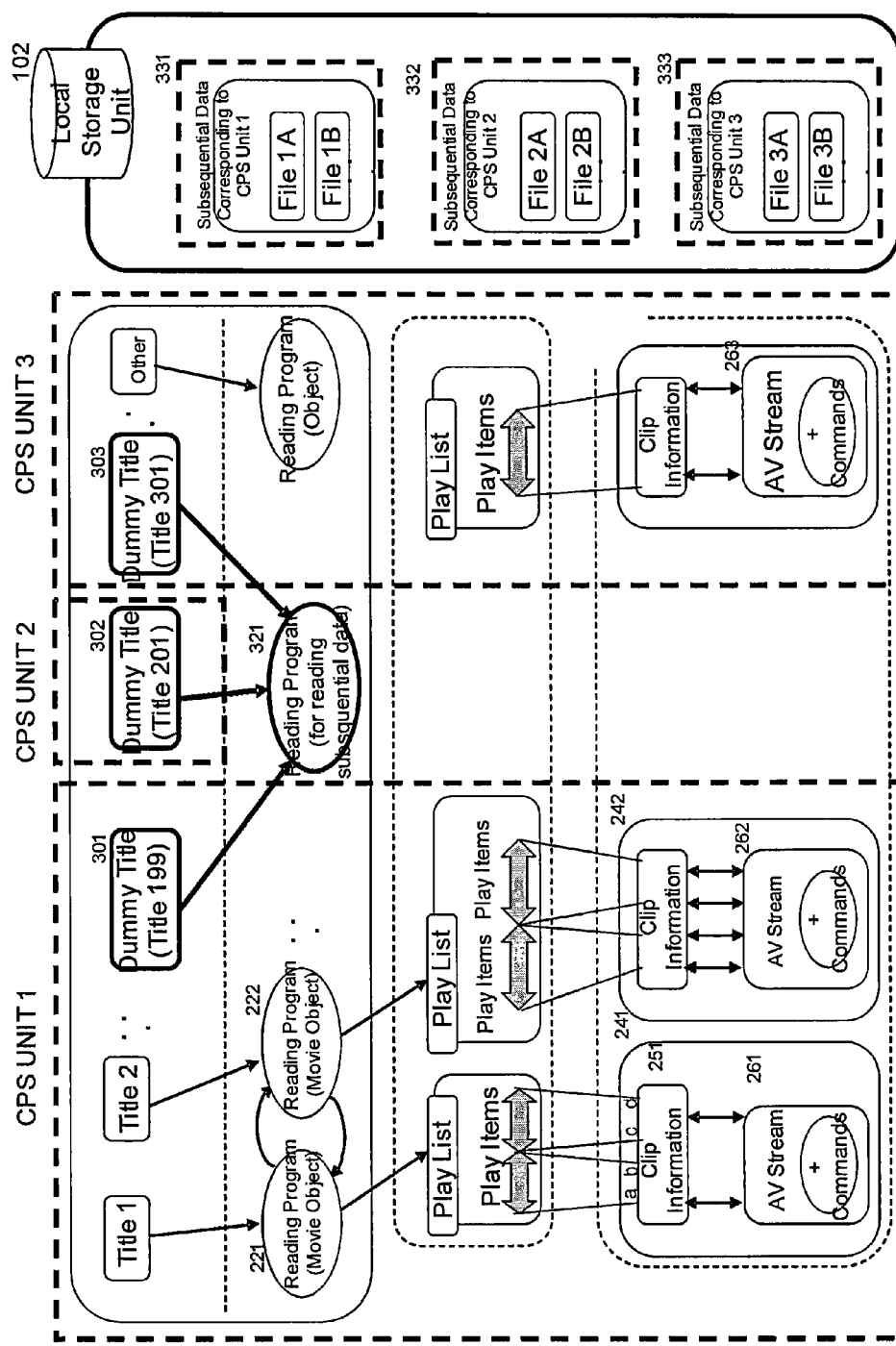
FIG. 9 is a diagram for explaining an example of the structure when a user information processing device obtains subsequential data from, for example, a content server and stores [the subsequential data] to a local storage unit.

FIG. 9 is a diagram for explaining an example of the structure when a user information processing device 100 obtains subsequential data from, for example, a content server and stores the subsequential data to a local storage unit 102. The subsequential data that has been obtained is stored in a local storage unit 102, structured from, for example, the hard disk of the information processing device 100 of the user.

The subsequential data illustrated in FIG. 9 is 331 through 333. FIG. 9 illustrates an example of subsequential data 331 that belongs to the CPS unit 1, the subsequential data 332 that belongs to the CPS unit 2, and subsequential data 333 that belongs to the CPS unit 3, where these subsequential data 331 through 333 are stored in the local storage unit 102.

As illustrated in FIG. 9, the dummy title 301, which has been set in the CPS unit 1, is associated with subsequential data 331, which is stored in the local storage unit 102. The dummy title 302, which has been set in the CPS unit 2, is associated with subsequential data 332, which is stored in the local storage unit 102. The dummy title 303, which has been set in the CPS unit 3, is associated with subsequential data 333, which is stored in the local storage unit 102. By specifying these titles, processes are performed to read the respective subsequential data.

Figure 10:
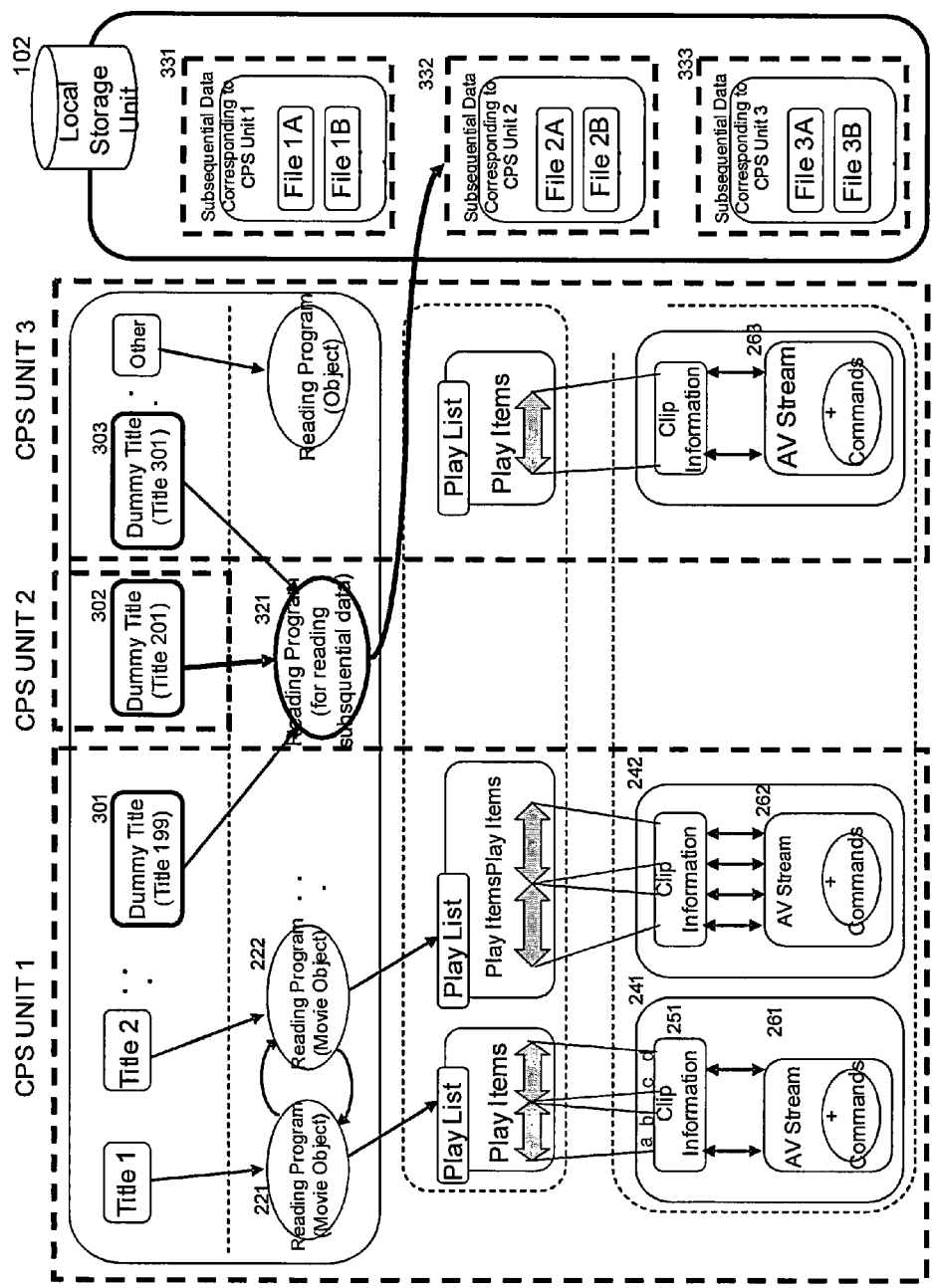
FIG. 10 is a diagram for explaining the processing when performing a process of reading the subsequential data through specifying a title.

For example, as illustrated in FIG. 10, the subsequential data reading program 321 is evoked by specifying the dummy title 302 of the CPS unit 2, and the subsequential data 333 is read by this subsequential data reading program 321. Note that, as described above, when this subsequential data is read, a VFS (virtual file system) that combines the content that is stored in the information recording medium (disc) 200 and the content that is stored in the local storage unit 102 is formed and the read process is performed using the VFS.

Note that in the examples explained in reference to FIG. 5 through FIG. 10, the CPS unit 2 is set as a unit that does not include, as read content, content that is stored on the disc. In this way, CPS units that do not include content are created in advance at the time that the disc is created, and downloaded data (subsequential data) that is obtained from the server is set in association with a title within the CPS unit. Given these settings, it is possible to share the use of encrypted content (subsequential data) across different discs. In such a case, the encryption key that is assigned to the CPS unit 2 can be shared and used across different movie titles on different discs.

Figure 11:
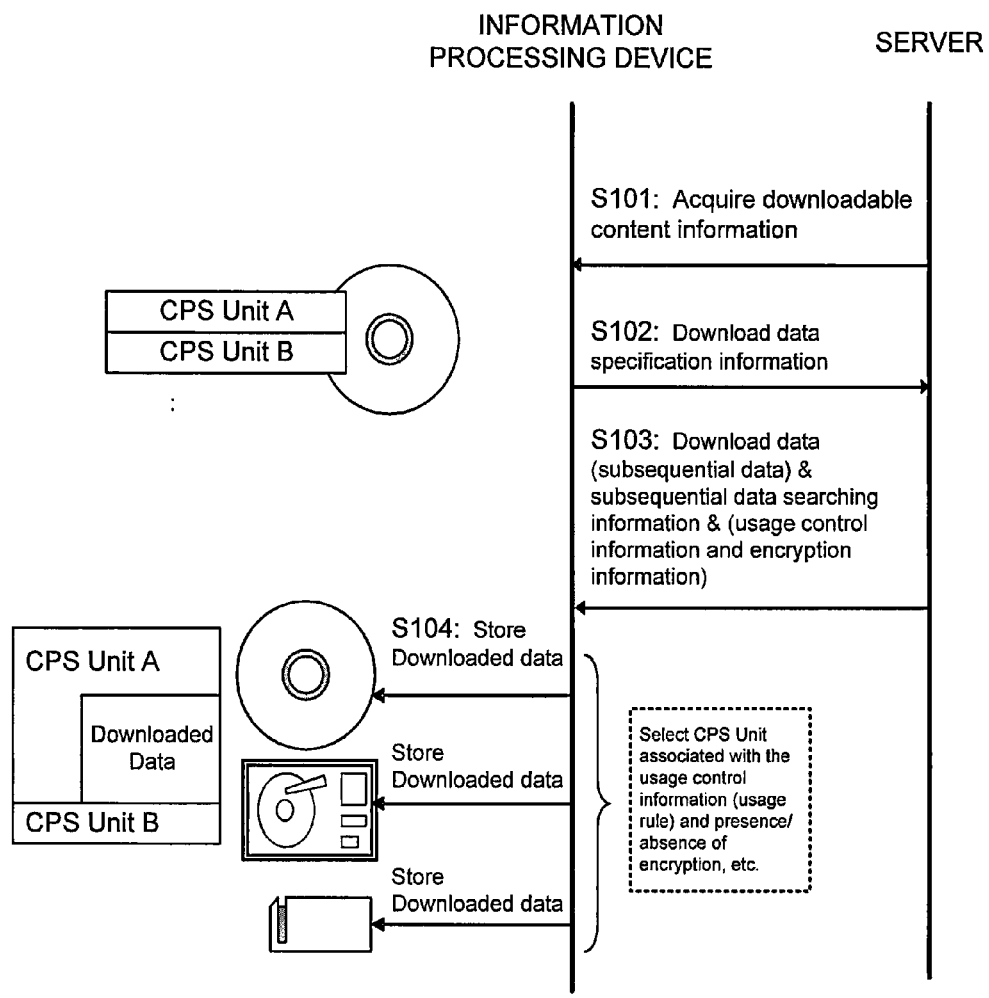
FIG. 11 is a sequence diagram for explaining the sequence of processes for obtaining subsequential data in an information processing device as set forth in the present invention.

The processing sequence by which the user information processing device obtains the subsequential data from the content server will be described next in reference to FIG. 11. First, in Step S101, the information processing device receives information pertaining to content that can be downloaded from the content server that provides download data as subsequential data. Next, in Step S102, the information processing device sends, to the server, information to specify the download data.

The server verifies the validity of the data request, and if the validity is confirmed, the requested download data is then sent to the information processing device in Step S103. For example, this download data may be alternate soundtrack data for an AV stream, subtitling data, or a reading program for special content, or the like.

Furthermore, in addition to this downloaded data (subsequential data), subsequential data searching information, including a process for searching subsequential data when reading the downloaded data (subsequential data), or information that is applied to the file name setting process in the virtual file system (the manifest file (BUMF)) is obtained. A specific example of the subsequential data searching information and an example of its use will be explained at a later stage. Furthermore, the settings may also be such that the usage control information (usage rules) and information pertaining to whether or not there is encryption, relating to the downloaded data (subsequential data), or CPS unit specifying information for specifying the CPS unit to which the downloaded data should belong, will be sent.

When, in addition to the downloaded data (the subsequential data), CPS unit specifying information, usage control information (usage rules) corresponding to the downloaded data (subsequential data), or information pertaining to whether or not there is encryption, is received, the user information processing device performs a process for assessing the CPS unit to which the downloaded data (the subsequential data) belongs in accordance with the information.

For example, in the case wherein the usage control information corresponding to the CPS unit 1 is set to copy-prohibited and the usage control information corresponding to the CPS unit 2 is set to copy-allowed, and the downloaded content is copy-prohibited content, then a process would be performed to associate the downloaded content with a dummy title that is set for the CPS unit 1. If the downloaded content is copy-allowed content, then a process is performed to associate the downloaded content with a dummy title that is set for the CPS unit 2.

If the information for determining the CPS unit is not received from the server, then the information processing device determines the CPS unit for membership according to a rule (default) that has been established in advance. For example, a variety of settings is possible, such as setting to cause membership in a CPS unit that has been set for subsequential data.

In Step S104, the information processing device stores the downloaded data that has been acquired from the server onto the information recording medium, or into a hard disk of the information processing device, or onto a storage unit, such as a removable memory.

In other words, the data processing unit 101 of the information processing device 100 illustrated in FIG. 1 executes a process for selecting a title, which is an index for specifying reading of the subsequential data, from the dummy titles that have been recorded on the disc in advance, for setting that title as the title for the subsequential data, and for storing in the local storage unit 102. At the time of this processing, the data processing unit 102 sets, as the membership unit for the subsequential data, a unit that is associated with usage control information that matches the usage control status of the subsequential data. Conversely, if the subsequential data is encrypted data, then a unit that is associated with encrypted content is set as the membership unit, but if non-encrypted data, then a unit that is associated with non-encrypted content is set as the membership unit. Conversely, the membership unit for the subsequential data is set in accordance with unit specifying information received from the server that is the transmission source of the subsequential data.

Note that in Step S101, aside from the URL information, the reading interval information (timestamps for the starting point and ending point), the studio ID, the package ID, the volume ID, the title ID, the movie object ID, the play list ID, or the like, which are values that are established in the Blu-ray Disc ROM standard, or the like, can be applied as the downloaded data specifying information that is sent from the server, or a value not established in the Blu-ray Disc ROM standard, or the like, may be used as the downloaded data specifying information. A variety of data can be applied as the downloaded data specifying information insofar as it is data that can specify the downloaded data on the server side, such as, for example, user-associated information such as a user ID or billing status, date and time information, or control data that is generated on the information processing device side in reading content, such as the number of times read, the range that has already been read, a game score, multi-stream read path information, or the like.

Figure 12:
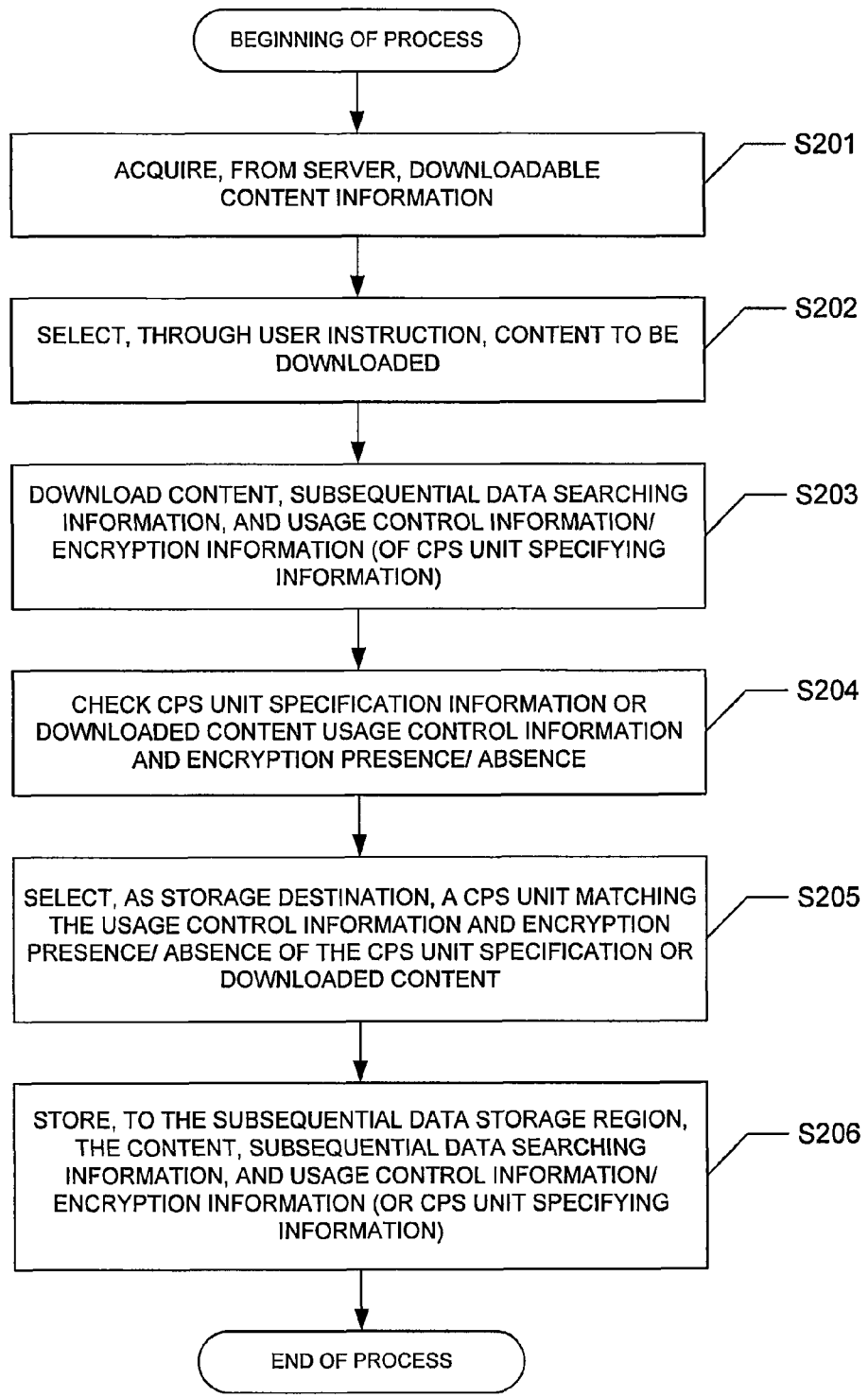
FIG. 12 is a diagram illustrating a flowchart for explaining the sequence of processes for obtaining subsequential data in an information processing device as set forth in the present invention.

FIG. 12 is a diagram illustrating a flowchart for explaining a sequence of processes that is performed by the information processing device of the user that performs the acquisition of the subsequential data. This process is executed by the data processing unit 101 of the information processing device 100 illustrated in FIG. 1. First, in Step S201, the information processing device receives information pertaining to content that can be downloaded from the content server that provides download data as subsequential data. Next, in Step S202, the information processing device displays a list of the content that can be downloaded, received from the server, onto, for example, a display, selects the content to be downloaded, and sends selection information to the server.

Next, in Step S203, the information processing device receives the downloaded data (subsequential data) from the server. At this time, in addition to this downloaded data (subsequential data), subsequential data searching information, including a process for searching subsequential data when reading the downloaded data (subsequential data), or information that is applied to the file name setting process in the virtual file system (the manifest file (BUMF)) is obtained. Furthermore, the usage control information (usage rules) and information pertaining to whether or not there is encryption, relating to the downloaded data (subsequential data), or CPS unit specifying information wherein the CPS unit to which the downloaded data should belong is specified, may also be received.

Next, in Step S204, if there is CPS unit specifying information, downloaded content usage control information, or encrypted/non-encrypted information received from the server, the information processing device performs a check of this information. In Step S205, a process is performed, in accordance with this information, to determine the CPS unit to which the downloaded data (the subsequential data) will belong.

That is, if there is CPS unit specifying information, the membership CPS unit of that downloaded content is determined in accordance with that specifying information. If there is usage control information or encrypted/non-encrypted information, then the CPS unit to which the downloaded content belongs is determined as a CPS unit having usage control and an encryption status that matches the usage control information and encrypted/non-encrypted information. If this information is not received from the server, then the information processing device determines the CPS unit for membership according to a rule (default) that has been established in advance.

In Step S206, the dummy title that has been set for the CPS unit selected in Step S205 is set as the index for reading the downloaded content, and the downloaded content is stored to the local storage unit. Note that subsequential data searching information, including a process for searching subsequential data when reading the downloaded data (subsequential data), or information that is applied to the file name setting process in the virtual file system (the manifest file (BUMF)) is also stored. Furthermore, when usage control information, encrypted/non-encrypted information, CPS unit specifying information, or the like, has been received from the server, these information are also stored in the local storage unit.

Figure 13:
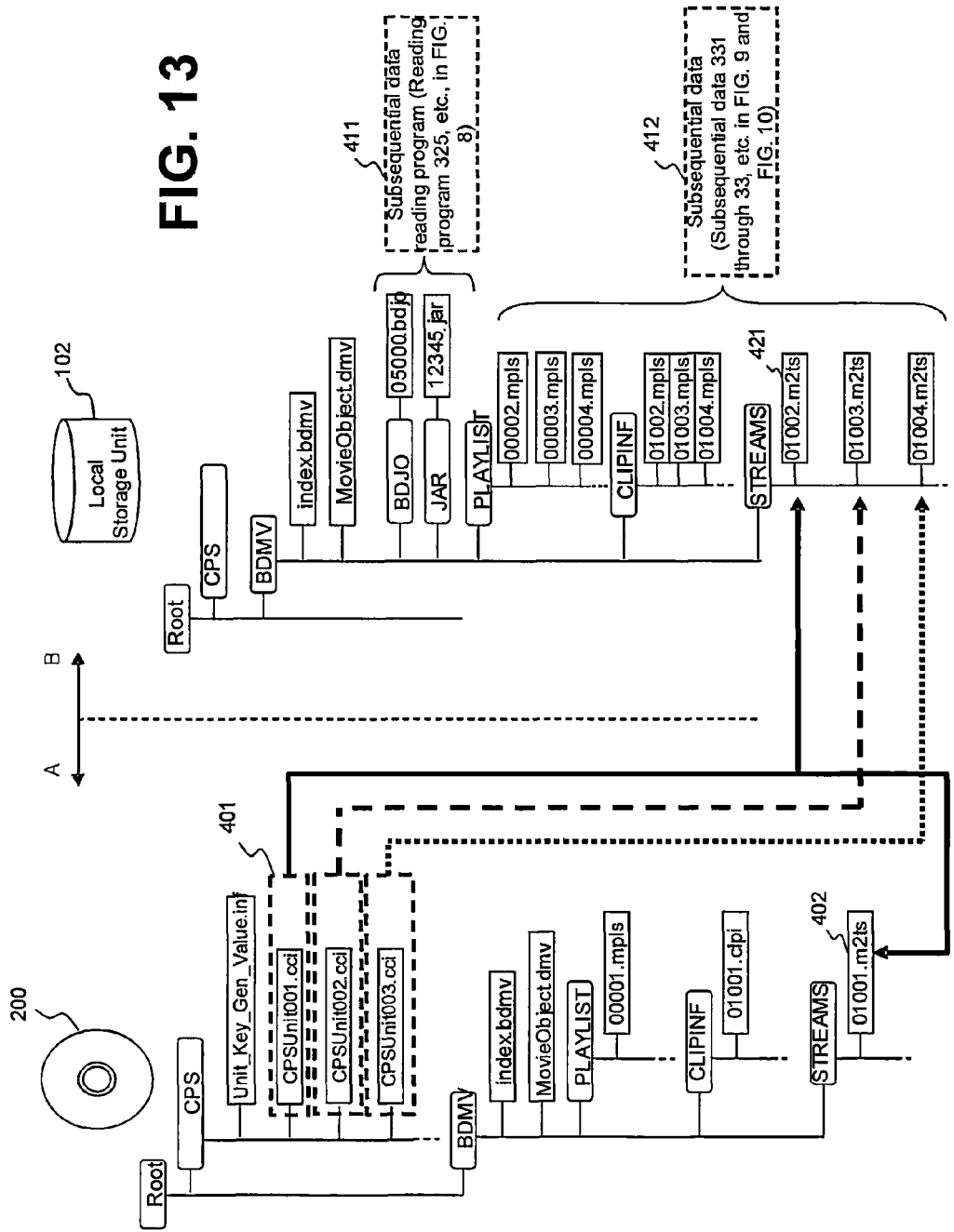
FIG. 13 is a diagram for explaining an example of a data recording directory in the information recording medium and a directory structure for a local storage unit.

FIG. 13 is a diagram illustrating an example of directory structures in the information recording medium (disc) 200 in the user information processing device, and in the local storage unit 102, such as a hard disk that stores the subsequential data. The left side of FIG. 13 is a directory A that corresponds to the CPS control unit structure stored in advance in the information recording medium 200, and the right side is a directory B that corresponds to subsequential data that is obtained or generated new. The example illustrated in FIG. 13 is provided with a variety of data in a "BDMV" directory, as content that all follows the Blu-ray Disc ROM standard format, with various types of control data stored in the "CPS" directory.

The "CPSUnit00n.cci" illustrated in the directory A of the information recording medium 200, shown on the left side of FIG. 13, is information control information (usage rules) set for the CPS unit n. In the example illustrated in FIG. 13, the directory is an example of the application, without modification, of the usage control information that has already been recorded to this disc to the subsequential data, obtained subsequentially, as well. That is, this is an example of a directory when no special subsequential data usage control information has been downloaded from the server.

In the directory for the local storage unit 102, illustrated on the right side of FIG. 13, the data 411 is, for example, the subsequential data reading program 325, explained earlier in reference to FIG. 8, etc. The data 412 is subsequential data, and is structured from play lists, clip information, AV stream data, and the like.

In this directory, the data "01002.m2ts" that is shown in the stream data, for example, is set as subsequential data belonging to the CPS unit 1, wherein usage control is performed according to the usage control information (usage rules) that apply to the CPS unit 1, or in other words, in accordance with the "CPSunit001.cci" 401. This subsequential data "01002.m2ts" has the dummy title 301, explained in reference to FIG. 5 through FIG. 10, for example, set as the index thereof, where the subsequential data read program is launched and [this data] is read by specifying the dummy title 301. Note that the title data that includes the dummy title is stored in the "index.bdmv" of the directory A and the reading program for, for example, the movie object that is included in the subsequential data reading programs is stored in "MovieObject.bdmv."

As described above, subsequential data that is not stored as the original data on the information recording medium that stores the content that is controlled by the CPS unit is stored in a local storage unit such as a hard disk, a flash memory, or the like. In order to treat this new data as data that is subject to control by the CPS control data of the information recording medium, it is necessary to be able to identify the subsequential data as data that is subject to control by the CPS control data of the information recording medium. The structure of this identification will be described below.

Figure 14:
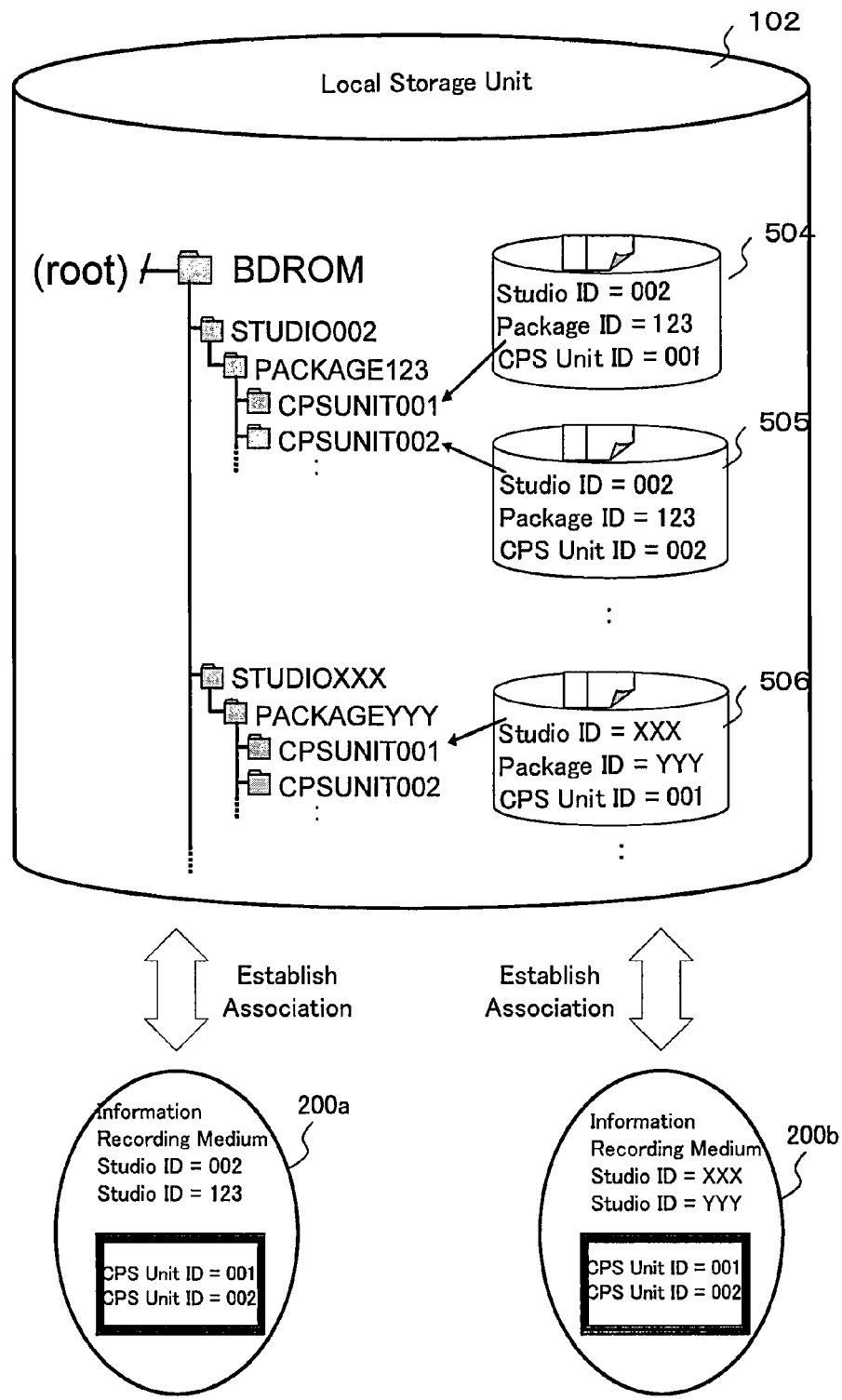
FIG. 14 is a diagram for explaining an example of the structure of recorded data in a local storage unit.

FIG. 14 is a diagram illustrating the structure of the relationships between the subsequential data and the CPS units in a structure wherein the subsequential data that is stored in storage means aside from the information recording medium that has the original CPS units, such as, for example, a local storage unit 102 that is, for example, the hard disk of the information processing device.

When subsequential data is recorded in storage means other than the information recording medium that has the original CPS units, then, as illustrated in FIG. 14, the subsequential data corresponding to the different information recording media 200a and 200b, which each have their respective CPS units, is stored in the local storage unit 102, such as a single hard disk.

In this case, a variety of subsequential data that is stored in the local storage unit 102 can be divided by whether the subsequential data corresponds to the information recording medium 200a or the information recording medium 200b.

The information recording media 200a and 200b, as already explained in reference to FIG. 2, stores a studio ID as the identifier for the studio that edited the content that is stored in the information recording medium 200, and a package ID as the identifier for the package, as the manufacturing unit in the information recording medium 200.

As is illustrated in FIG. 14, a studio ID, package ID, and CPS unit ID are applied as identification data to each of the subsequential data 404, 405, and 406 that are stored in the local storage unit 102, so as to set up a directory tree structure of the studio ID, package ID, and CPS unit ID, in that order, as shown in the figure, where data storage and management is performed based on this directory tree structure.

Data generated in any given format can be stored within the directories that are assigned for each individual CPS unit ID. For example, if the data is data that is generated by an executable application, such as Java, then the data should be of a format that can be interpreted by the executable application, such as Java, when the data is read, and is not constrained to a specific format.

Figure 15:
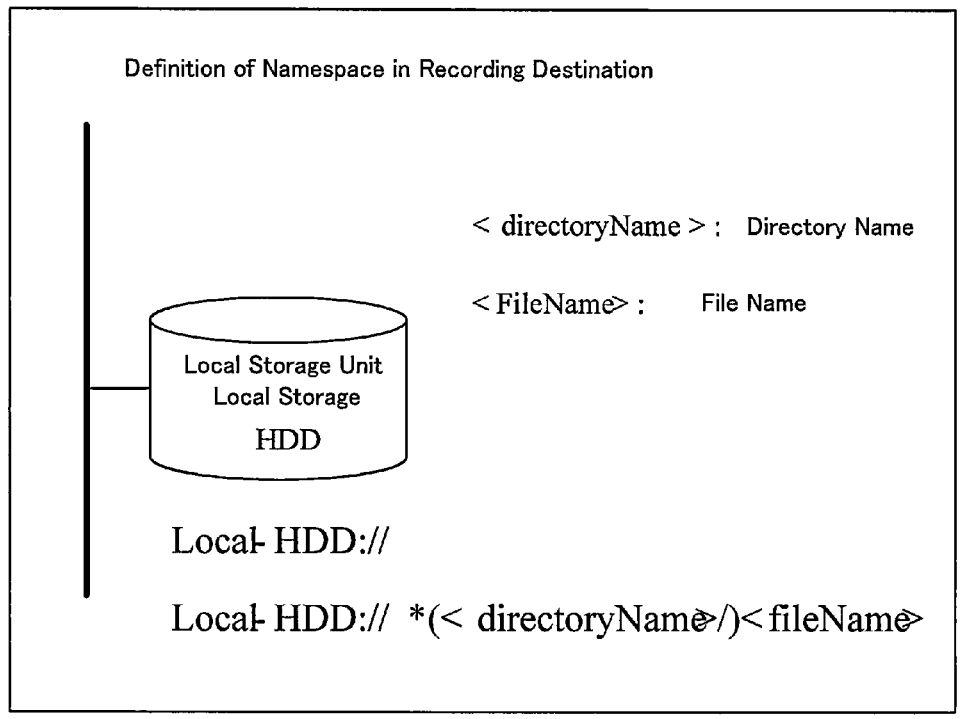
FIG. 15 is a diagram for explaining a structure for identifying and obtaining subsequential data as a CPS unit.

When this type of directory tree is established, the referencing processes, when calling data that is recorded in storage means other than the information recording medium that has the original CPS units from an executable program, such as Java, or in other words, from the subsequential data reading program 321 described referencing, for example, FIG. 5 through FIG. 10, can be executed as a calling procedure based on the namespace, the directory, and the filename as shown in FIG. 15. That is, the region for writing data in the information recording medium that has the original CPS unit is defined as a namespace such as hard disk="Local-HDD://," and processes are performed, such as reading, updating, and rewriting, for file data wherein a file that stores new data is specified by a namespace, a directory, a filename.

Accordingly, the subsequential data that has been obtained or produced subsequentially as data that corresponds to the CPS unit content that is stored in the information recording medium (disc) 200 is stored for use in the local storage unit 102, such as a hard drive. When the information processing device 100 uses a variety of information recording media (discs) 200a, 200b, . . . , then a plurality of subsequential data will be stored for use in the local storage unit 102.

The VFS (virtual file system) that is established when subsequential data that is stored in the local storage unit 102, such as a hard disk, is read in conjunction with the content that is stored on the information recording medium (disc) 200 will be described in reference to FIG. 16. If, for example, the content that is stored in the information recording medium (disc) 200 is movie content in French, and the subsequential data that is stored in the local storage unit 102, such as a hard disk, is Japanese-language subtitle data corresponding to the movie content, it is possible to play the movie with Japanese-language subtitling by reading both together.

When reading this type of compound content, the information processing device 100 combines, virtually, the directory and files that include the subsequential data control file of the local storage unit 102 and the directories and files of the information recording medium (disc) 200. That is, a VFS (virtual file system) is established. The process for setting up this VFS (virtual file system) establishes, in a single virtual directory, the data files on the disc and the corresponding subsequential data files in the local storage unit. This process enables high-speed access to files that are stored on different recording media.

Figure 16:
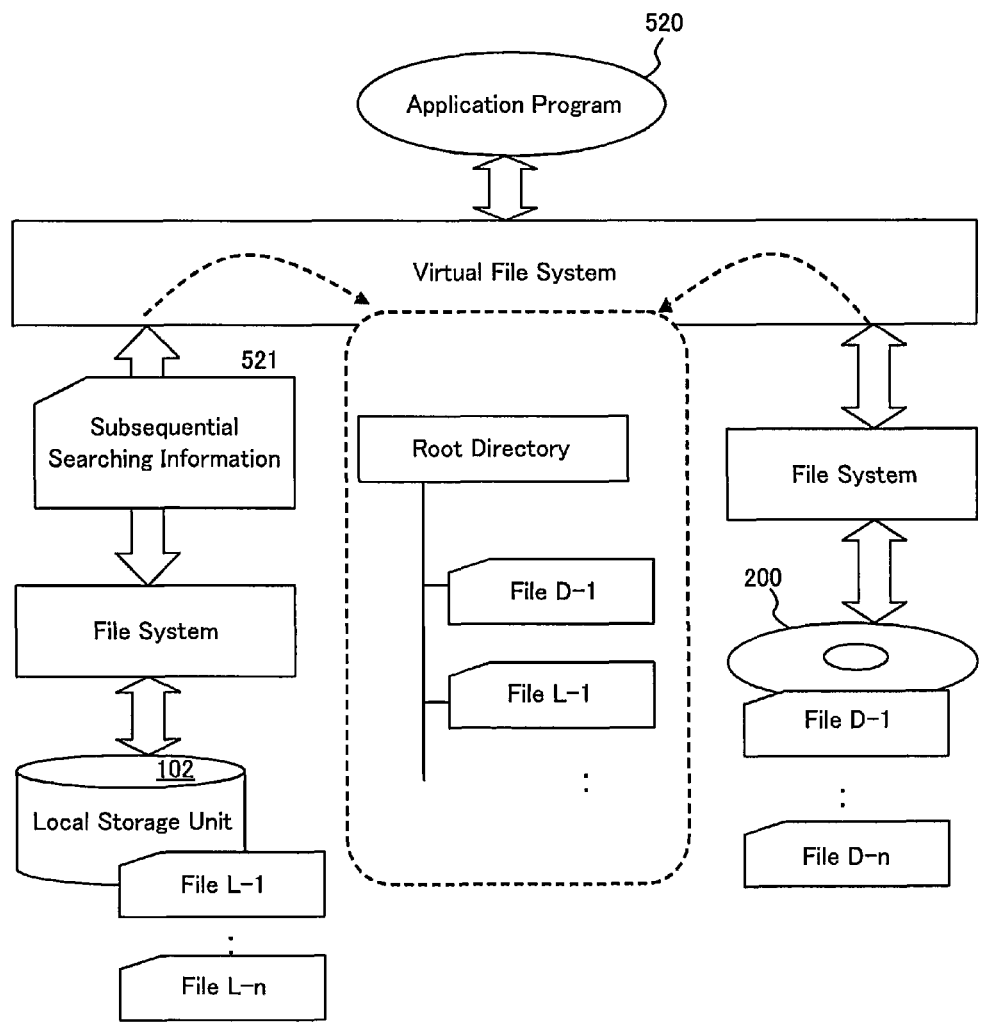
FIG. 16 is a diagram for explaining a virtual file system that is generated in an information processing device.

The application program 520 illustrated in FIG. 16 is an application program for performing, in the information processing device 100, the processes of movie objects, subsequential data read control programs (BD-J applications), and the like. The application program 520 handles, via the virtual file system, files that are stored on the information recording medium (disc) 200 and files that are stored in the local storage unit 102. The application program 520 obtains, via the virtual file system, the required subsequential data files through the use of subsequential data searching information 521, which is searching information for files that are recorded in the local storage unit 102.

The virtual file system plays the role of concealing, from the application program 520, the differences between the recording media (the file systems). Consequently, the application program 520 can use the same APIs, etc., to handle the files that are stored on both of the recording media through, without being aware of the differences in the recording media on which the files are stored.

For example, when the disc is loaded into the device, or when an application program is launched, the virtual file system is generated by merging the file system on the disc with the file system on the local storage unit 102, and the virtual file system (VFS) that is generated is stored in the memory of the information processing device 100. In this case, the virtual file system is updated each time there is a change in a directory or file that is stored in the local storage unit 102 by, for example, writing a file.

Figure 17:
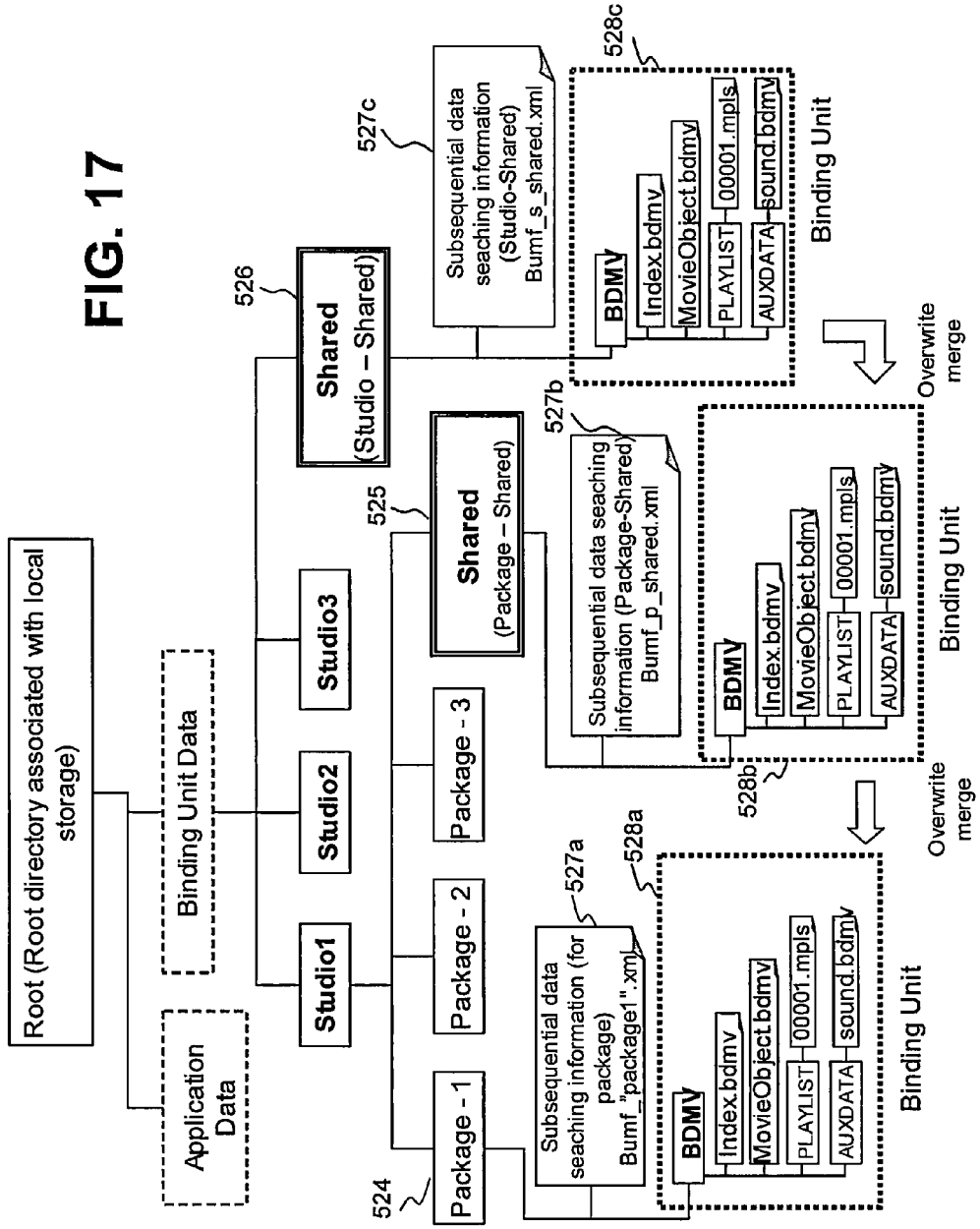
FIG. 17 is a diagram for explaining an example of a directory structure of a local storage unit in an information processing device and an example of setting subsequential data searching information.

FIG. 17 will be referenced next to explain an example of the establishment and of the use of subsequential data searching information 521, which is searching information for files stored in the local storage unit 102. The directory illustrated in FIG. 17 illustrates a file control directory of a system file for general use established in the local storage unit 102, such as the hard disk explained already in reference to FIG. 14, or a removable memory.

An application data directory that is used by a variety of application programs that are executed in the information processing device and a binding unit directory wherein the subsequential data files corresponding to the aforementioned CPS units are established are established under the root directory. As described above, the subsequential data, such as downloaded data, that are recorded in the local storage unit 102, such as a hard disk, are bound to data in the information recording medium (disc) 201 before the commencement of the reading process, to thereby be structured into single virtual file system, and thus are termed a "binding unit." The subsequential data that is subject to binding to the data in the information recording medium (disc) 200 is all established in the binding unit directory.

The directory structure illustrated in FIG. 17 is a structure wherein a studio directory is established under the binding unit directory, and a package directory is established under the studio directory. The structures are the same as the directories that were explained already in reference to FIG. 13.

Package1, Package2, and Package3 are directories corresponding to the respective discs that store the content corresponding to the respective CPS control units. For example, a subsequential data file corresponding to the content that is stored in the information recording medium (disc) 200 for which the package ID=1 is set is established in the package-unique directory 524 to the package that corresponds to the package 1. In the example illustrated in the figure, the binding unit 528a is the subsequential data. The subsequential data is established as a binding unit that includes an index, a movie object, a play list, and/or AV data.

While only a single binding unit 528a is illustrated in the figure in the package-unique directory 524 that corresponds to Package1, a plurality of binding units may be set therein. The subsequential data searching information 527a is a file for searching data that has been established in the package-unique directory 524 that corresponds to Package1.

In the example illustrated in the diagram, the subdirectories of Package1 through Package3 and a package-shared directory 525 are provided in the Studio1 directory. The package-shared directory 525 stores the subsequential data that is shared and used when using the content storage packages (discs) corresponding to Studio1.

For example, if a movie studio A stores a large number of contents on individual ROM discs and provides these to the user, subsequential data that are unique to each ROM disc are associated with the individual ROM discs, where this subsequential data that are unique to each package, such as subtitling data, will be recorded in the binding units that are established in the respective Package1 through Package3 directories. However, when it comes to, for example, movie previews and other service data, and the like, that do not require associations with any particular content, it is preferable for this content to be usable whenever reading any ROM disc on which is stored content provided by that movie studio A. This type of data is put in the package-shared directory 525. This type of data is included in the binding unit 528b. The subsequential data searching information 527b is a file for searching data that has been established in the package-shared directory 525.

Furthermore, the figure illustrates directories for studios 1 through 3, and a studio-shared directory 526, as the subdirectories in the binding unit data directories. The studio-shared directory 526 stores the subsequential data that is shared and used when using the content storage packages (discs) corresponding to studios 1 through 3.

If, for example, a plurality of different movie studios A through C each stored contents on their respective ROM discs and provided them to the user, when it comes to that data that does not require an association with any particular movie studio, for example, a variety of different service data, advertising content, etc., it is preferable for this content to be usable when reading any of the ROM discs whereon content is stored, independent of the movie studio. This type of data is put in the studio-shared directory 526. This type of data is included in the binding unit 528c. The subsequential data searching information 527c is a file for searching data that has been established in the studio-shared directory 525.

For example, when a disc with package ID=1 is loaded into the information processing device, the subsequential data that can be used is the binding unit 528a that is provided in the package-unique directory 524 associated with package 1, the binding unit 528b that is provided in the package-shared directory 525, and the binding unit 528c that is provided in the studio-shared directory 526.

In the virtual file system that has already been explained in reference to FIG. 16, the data that is provided in these three different binding units, and the data that is stored in the information recording medium (disc) 200 are merged and virtual files are set up. As has already been described above, when the disc is loaded into the device, or when an application program is launched, the virtual file system is generated by merging the file system on the disc with the file system on the local storage unit 102, and the virtual file system that is generated is stored in the memory of the information processing device 100.

As is shown in FIG. 17, when there is a plurality of binding units to be shared, the merging processes are performed in the sequence of (1)→(2)→(3) to merge (1) the binding unit 528c that is provided in the studio-shared directory 526, (2) the binding unit 528b that is provided in the package-shared directory 525, and (3) the binding unit 528a that is provided in the package-unique directory 524 associated with Package 1, and if there are files with identical filenames, a process is performed to overwrite with the later files. Given this process, a merging process is performed in a priority order, with the files corresponding to the package having the highest priority, followed by the files that are shared between packages, followed last by the files that are shared between studios.

The data structure of the subsequential data searching information files will be explained next in reference to FIG. 18. The file that is applied to searching subsequential data that is stored in storage means (the local storage unit 102), such as a hard disk, is the subsequential data searching information file.

Figure 18:
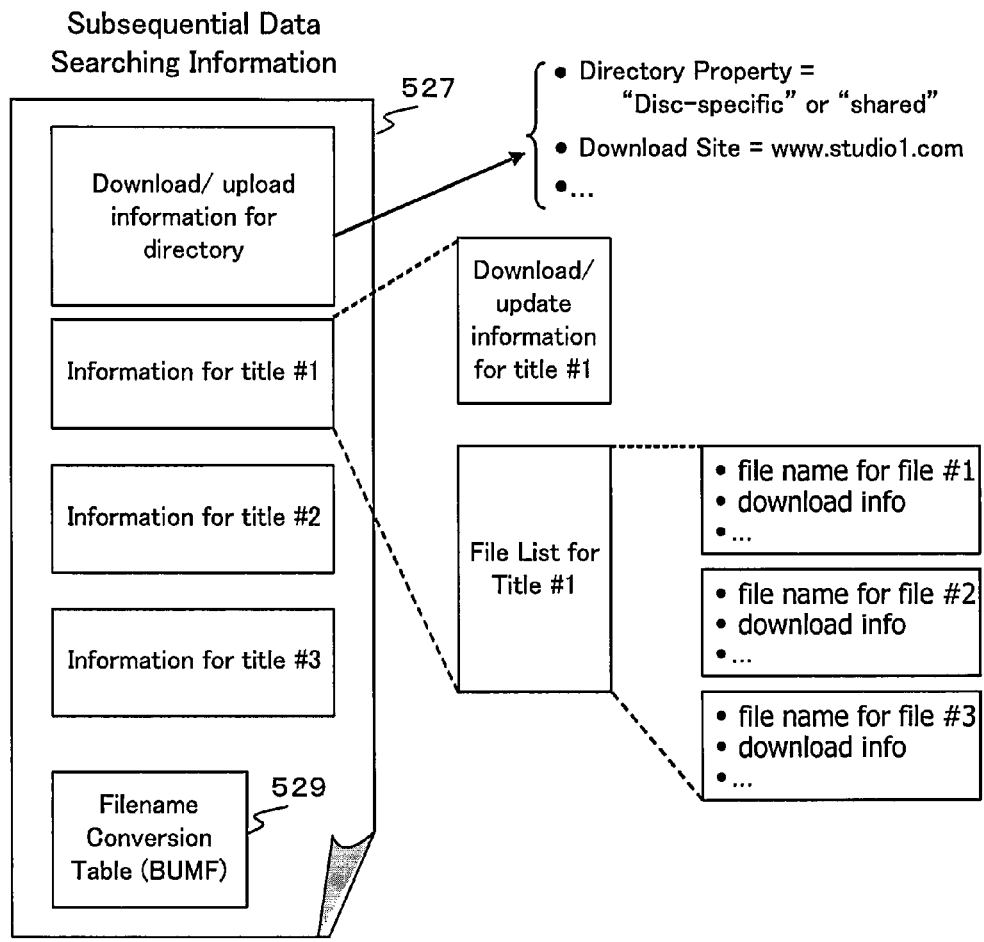
FIG. 18 is a diagram for explaining an example of the structure of subsequential data searching information.

As a shown in FIG. 18, in addition to storing directory properties and download site information, the subsequential data searching information file 527 stores, for the files stored in the directory, title correspondence information comprising correspondence information for each title (index), downloaded/updated information associated with the titles, and file lists corresponding to the titles. The file lists corresponding to the titles store the subsequential data file names and downloaded information, etc., associated with each title. An application that reads the content is able to obtain the filenames of the required files based on the titles, making it possible to select data based on the filenames.

The subsequential data searching information file 527 also stores a filename conversion table (BUMF) 529. As already explained above, when the subsequential data that is stored in the local storage unit 102 is read in conjunction with the content that is stored in the information recording medium (disc) 200, this is set in the VFS (virtual file system). It is necessary to perform a process to convert the filenames of the subsequential data that has been stored in the local storage unit 102 when setting up this virtual file system, and the filename conversion table (manifest file (BUMF)) is the table that is applied in this filename conversion process. The structure of the file name conversion table (BUMF) will be explained in reference to FIG. 19.

For example, filenames of the subsequential data files that are set in the studio-shared directory 526 illustrated in FIG. 17 are filenames that were set by the studio that provided the subsequential data, so it is possible that filenames will be redundant unless some sort of rule is set up. Consequently, it is necessary to establish a filename setting rule in advance, and then to store the subsequential data files that are provided with filenames according to the rule.

The method can be, for example, a method for avoiding redundancies through sharing information between users. For example, operations are possible wherein, when content that is used in a shared directory is to be created, a request is made to an administrative entity in advance, to obtain authorization to use a specific filename. For example, a method is possible wherein, when an AV stream file is to be downloaded using a shared directory, a request is made first to the administrative entity to obtain filename use rights for specific non-redundant filenames such as "001XX.m2ts" or "001XX.clpi".

Moreover, another method is the example of storing subsequential data in a shared directory that is given the name of the studio that provided the subsequential data. For example, for subsequential data associated with studio A, the filenames are given as, for example, "studioA.STREAM.00001.m2ts" and "studioA.CLIPINF.00001.clpi," and for subsequential data associated with, for example, the studio B, [the filenames are given as, for example] "studioB.STREAM.02001.m2ts" and "studioB.CLIPINF.02001.clpi."

However, when these studio names are included in the filenames that are established in the virtual files that are generated through the merging process, described above, this may result in a discrepancy from the filenames that are recorded as filenames that can be used in the reading process application, which may make the subsequential data unusable.

The filename conversion table (manifest file (BUMF) illustrated in FIG. 19 is applied in order to solve this problem. That is, the filename conversion table (BUMF) 529 is recorded in the subsequential data searching information file 527, and at the time of the merging process when generating the virtual files, the filename conversion table is referenced to determine the filenames to be set for the virtual files.

The filename conversion table (BUMF) illustrated in FIG. 19 has a structure wherein associations are established between each entry for the filename in the local storage unit, the studio ID, the package ID, and the filename after conversion.

The filename in the local storage unit is the actual filename when recording into the local storage unit 102 that stores the subsequential data. To prevent redundancy, the studio name, for example, is added to establish the filename.

The filename conversion process is determined dependent on the package ID and the studio ID corresponding to the read content. When the reading process is performed, a binding process is performed on the subsequential data and the data on the information recording medium (disc) 200. All of the studio IDs and package IDs have associations established in regards to the subsequential data to be used, and the information processing device that performs the content reading process obtains the studio ID and package ID of the content to be read, and based on these IDs, obtains the post-conversion file name through the application of the file name conversion table, and establishes, as the filename in the virtual file system, this filename that has been obtained.

For example, if the filename on the local storage unit 102 is "studioA.STREAM.00001.m2ts," and the studio ID of the content to be read is 1, and the package ID of the content to be read is 1, 2, and 3, then the post-conversion file name will be "BDMV/STREAM/00001.m2ts." This post-conversion file name of "BDMV/STREAM/00001.m2ts" is the filename that can be used by the reading application.

Performing the conversion of the filename through the application of the filename conversion table (BUMF) in this way makes it possible to set the filename freely in the directory in the local storage unit 102, making it possible to create filenames freely without redundancy.

Note that although the second and third entries in the filename conversion table (BUMF) illustrated in FIG. 19 both have "studioC.STREAM.00002.m2ts" as the filenames in the local storage unit, when the studio ID=1 and the package ID=1, 2, or 3, then the post-conversion filename will be "BDMV/STREAM/00002.m2ts," but if the studio ID=2 and the package ID=4, 5, or 6, then the post-conversion filename will be "BDMV/STREAM/00012.m2ts," and thus the structure is one wherein the conversion will be to different filenames depending on the values of the studio ID and the package ID. Performing the filename conversion process through the application of the filename conversion table in this way enables, for example, the establishment of different files to be applied in different reading applications.

Note that this type of filename conversion table may be a structure that is stored and used in a subsequential data searching information file that is established in a shared directory such as the studio-shared directory 526, illustrated in FIG. 17, or the package-shared directory 525, or the like, or may be stored instead in a subsequential data searching information file that is established in a directory associated with the package ID. A file that is in a directory corresponding with a package ID, in contrast with a shared directory, is completely under the control of a single studio, and thus can be stored with a filename of a format that can be managed easily, making it possible to convert to a filename (such as "XXXXX.m2ts") based on a format that can be interpreted by the reading application, when structuring the virtual file system.

Note that while in the directory structure illustrated in FIG. 17 a subsequential data storing directory structure corresponding to a local storage unit 102 that has three different types of subdirectories, namely (1) studio-shared directories, (2) package-shared directories, and (3) package-unique directories, is illustrated, a structure is also possible wherein the shared directories, namely the studio-shared directories and the package-shared directories, are absent.

An example will be explained of a structure for preventing tampering with subsequential data that is stored in local storage. The structure is one wherein, when storing new subsequential data in local storage, hash values are recorded for each subsequential data in the aforementioned subsequential data searching information and hash value validation is performed when using the subsequential data in order to perform tampering validation of the subsequential data.

An example of a structure wherein hash values are stored in subsequential data searching information 527 as subsequential data tampering validation values will be explained in reference to FIG. 20. In this subsequential data searching information 527, the data aside from the file tampering validation data 531 is identical to that which has already been explained in reference to FIG. 19, and thus explanations thereof will be omitted.

Figure 20:
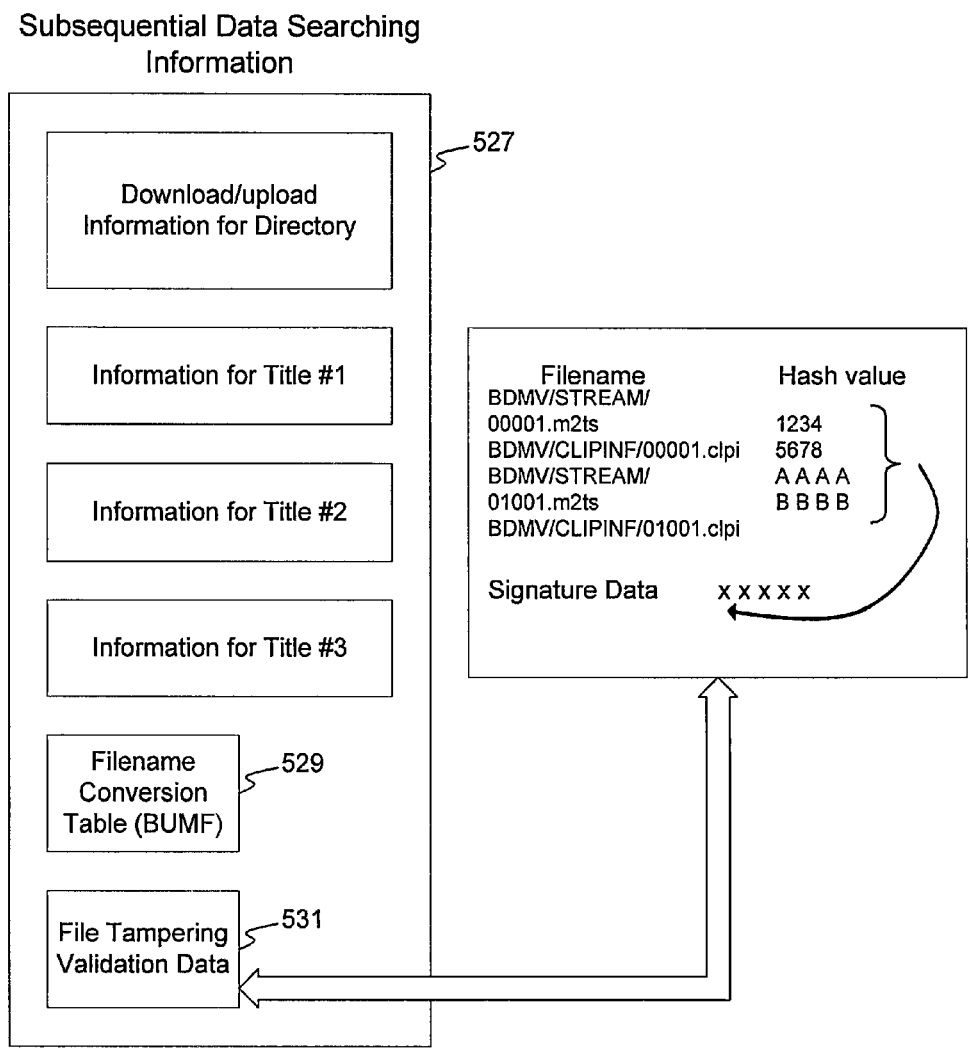
FIG. 20 is a diagram for explaining an example of the structure of subsequential data searching information.

The file tampering validation data 531, as is shown in FIG. 20, for example, comprises filenames of subsequential data stored in the local storage unit 102 and the correspondence data for the hash values generated based on the subsequential data. Furthermore, signature data is established for the hash values. As with the access control information described above, the signatures are generated by the private keys corresponding to the studios, where the information processing device uses the public key of the corresponding studio to perform signature validation for the subsequential data to be used, and uses the subsequential data conditionally upon having confirmed that the subsequential data to be used has not been tampered with.

Note that while the example illustrated in FIG. 20 is an example wherein the hash values are established corresponding to each individual subsequential data file, the structure may instead be one wherein file groups may be established from a plurality of subsequential data files, and hash values may be calculated and stored relative to file groups. Additionally, the storage location for the hash values of the subsequential data files or the file groups is not limited to the subsequential data searching information, but instead the structure may be one wherein they are stored in access control information, or one wherein independent files are established and stored.

Next, the information processing device wherein the subsequential data is stored in the local storage unit will be explained in reference to the flowcharts illustrated in FIG. 21 and FIG. 22 in regards to the processing sequence when executing the process for reading the subsequential data. The subsequential data reading process is executed through the use of a subsequential data reading program such as explained above in reference to FIG. 5 through FIG. 10, and the flow illustrated in FIG. 21 and FIG. 22 is the processing sequence through the execution of the subsequential data reading program.

The following two modes are possible as reading process modes:

1) Processing in the case wherein the subsequential data reading program maintains the correspondence relationship of the CPS unit with the title that corresponds to the content to be read; and (2) Processing in the case wherein the subsequential data reading program does not maintain the correspondence relationship of the CPS unit with the title that corresponds to the content to be read.

Figure 21:
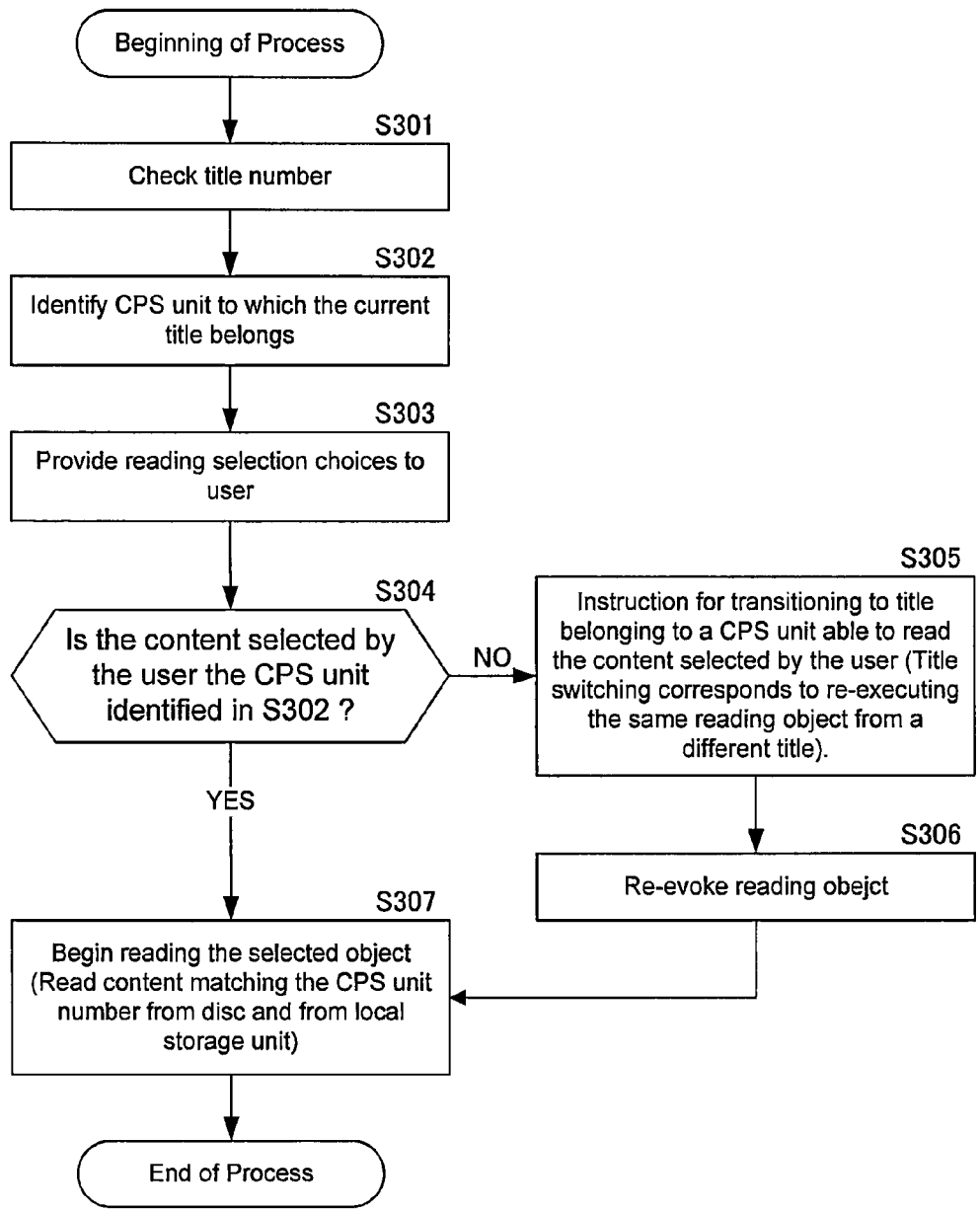
FIG. 21 is a diagram illustrating a flowchart for explaining the sequence of processes for reading content in an information processing device.
Figure 22:
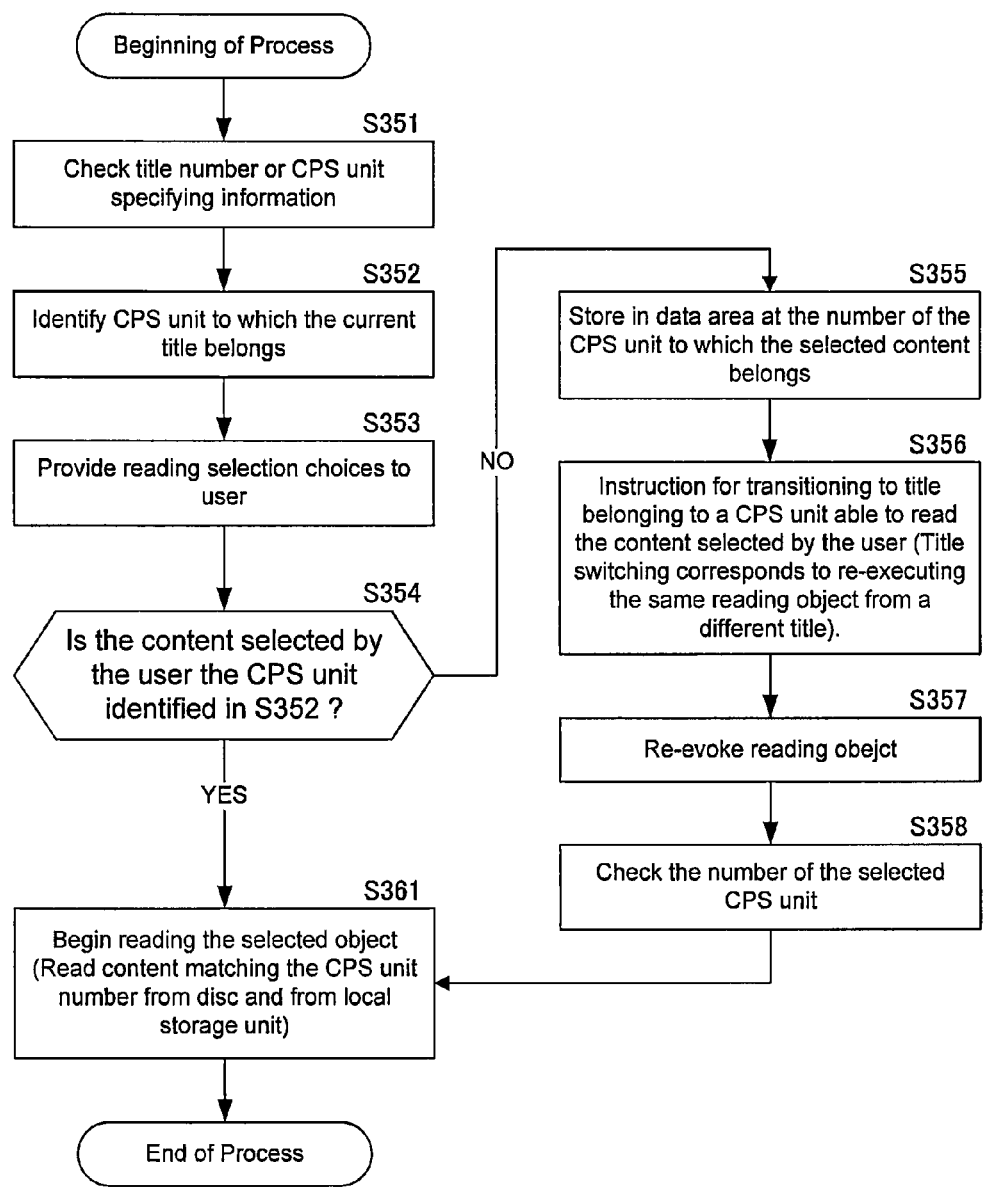
FIG. 22 is a diagram illustrating a flowchart for explaining the sequence of processes for reading content in an information processing device.

FIG. 21 illustrates the sequence of processes in the case of (1), above, and FIG. 22 illustrates the sequence of processes in the case of (2), above.

Processing in the case wherein the subsequential data reading program maintains the correspondence relationship of the CPS unit with the title that corresponds to the content to be read will be explained first in reference to FIG. 21.

In Step S301, the title of the content currently being read or the content to be read is confirmed, and in Step S302, the CPS unit containing the title that has been confirmed in Step S301 is identified.

In Step S303, the user is presented a content list of the subsequential data stored in the local storage unit, as reading (playback) selection choices, and selection information is inputted by the user.

In Step S304, a determination is made as to whether or not the content (subsequential data) selected by the user is of the same unit as the CPS unit identified in Step S302. If identical, then processing advances to Step S307, to start the reading of the content selected by the user. The data processing unit 101 of the time use information processing device 100 illustrated in FIG. 1, when reading the subsequential data, performs the process of reading the subsequential data that is stored in the local storage unit by evoking the subsequential data reading program through specifying the title that has been established as the title for the subsequential data. As a result, the content that belongs to the same CPS unit is read from the disc and the local storage unit.

The content that is read from the disc and from the local storage unit should belong to the same CPS unit. This is because the usage control information (usage rules) is established in association with the individual CPS units and, in principle, simultaneously reading content with different usage control information (usage rules) is not allowed. However, when it comes to free content, or the like, with no limitations on usage, it is possible to read content from any CPS at the same time.

Given this process, subsequential data (such as a Japanese-language subtitle for a French movie that is being read, from, for example, a local storage unit) that belongs to the same CPS unit as the CPS unit for content (such as the French movie) being read from, for example, a disc can be read in parallel using the VFS (virtual file system). The data processing unit 101 of information processing device 100 illustrated in FIG. 1 performs the structuring of a virtual file system to perform parallel reading of content stored on the disc and subsequential data stored in the local storage unit 102. Note that at the time of this process, the data processing unit 101 converts the filenames of the subsequential data stored in the local storage unit 102 in accordance with the file name conversion table.

If, in Step S304, the determination is that the content (subsequential data) selected by the user is not of the same unit as the CPS unit identified in Step S302, then processing advances to Step S305. In Step S305, an instruction to transition to a title that belongs to the CPS unit wherein the content selected by the user can be read, and the user title respecification, information is inputted. The title respecified by the user is a title corresponding to the subsequential data that belongs to the same unit as the CPS unit specified in Step S302. Note that this title switching corresponds to a re-execution of the same read object from a different title.

In Step S306, the read object is re-evoked according to the respecified title. Processing advances to Step S307 next, to start the reading of the content selected by the user. As a result, the content that belongs to the same CPS unit is read from the disc and the local storage unit.

In this way, the data processing unit 101 of the information processing device 100 identifies a unit belonging to the content being read in the information processing device 100, and performs a read content limiting process that selects, as read-enabled content, only that subsequential data belonging to the same unit as the identified unit. Note that this process is executed in accordance with, for example, a subsequential data reading program.

As already explained above in reference to FIG. 5 through FIG. 9, the program for reading subsequential data is a program that is set to be evoked by different titles of a plurality of different units that are set on the disc, and the data processing unit 101 of the information processing device 100, illustrated in FIG. 1, evokes the same program for reading the subsequential data, based on specifications of different titles of a plurality of different units, to execute a process for reading subsequential data.

Note that as explained in reference to FIG. 8, etc., above, a process wherein an updated program of the subsequential data reading program that is stored on the disc is obtained from the outside and stored in the local storage unit 102 is also possible, wherein the data processing unit 101 of the information processing device 100 illustrated in FIG. 1, when performing the process for obtaining and storing the updated program, stores the updated subsequential data reading program in the local storage unit 102 as a setting that is evoked by specifying a dummy title.

Processing in the case wherein the subsequential data reading program does not maintain the correspondence relationship of the CPS unit with the title that corresponds to the content to be read will be explained next in reference to FIG. 22.

In Step S351, the title of the content currently being read or the content to be read, or the CPS unit specifying information, is confirmed, and in Step S352, the CPS unit containing the title that has been confirmed in Step S351 is identified.

In Step S353, the user is presented a content list of the subsequential data stored in the local storage unit, as reading (playback) selection choices, and selection information is inputted by the user.

In Step S354, a determination is made as to whether or not the content (subsequential data) selected by the user is of the same unit as the CPS unit identified in Step S352. If identical, then processing advances to Step S361, to start the reading of the content selected by the user. As a result, the content that belongs to the same CPS unit is read from the disc and the local storage unit.

Given this process, subsequential data (such as a Japanese-language subtitle for a French movie that is being read, from, for example, a local storage unit) that belongs to the same CPS unit as the CPS unit for content (such as the French movie) being read from, for example, a disc, can be read in parallel using the VFS (virtual file system).

By contrast, if, in Step S354, the determination is that the content (subsequential data) selected by the user is not of the same unit as the CPS unit identified in Step S352, then processing advances to Step S355. In Step S355, the unit number of the CPS to which content selected by the user belongs is held in a data region (a partial region of the memory), and in Step S356, an instruction to transition to a title that belongs to the CPS unit wherein the content selected by the user can be read, and the user title respecification information, is inputted.

In the present example of embodiment, the subsequential data reading program does not maintain the correspondence relationship information of the title corresponding to the content to be read and the CPS unit, so, in Step S355, the number of the CPS unit to which the content selected by the user belongs is first stored in memory, and then the title belonging to the CPS unit number that has been stored in memory is retrieved, after which, in Step S356, the title belonging to the CPS unit that can play the content selected by the user is obtained and presented to the user.

In Step S356, the title re-specified by the user is a title corresponding to the subsequential data that belongs to the same unit as the CPS unit specified in Step S352. Note that this title switching corresponds to a re-execution of the same read object from a different title.

In Step S306, the read object is re-evoked according to the re-specified title. Processing advances to Step S307 next, to start the reading of the content selected by the user. As a result, the content that belongs to the same CPS unit is read from the disc and the local storage unit.

As described above, the information recording medium (disc) as set forth in the present invention is an information recording medium whereon is stored data including stream data to be read and titles that are indexes for specifying content reading, divided into CPS units as usage control units for the content, wherein the titles include dummy titles that are not set as indexes for reading stream data that has been recorded on the information recording medium, where the dummy titles are titles that can be set as indexes in association with subsequential data that is stored in a local storage unit of the information processing device after being acquired or generated subsequentially by the information processing device wherein the information recording medium is installed, enabling the reading, by an information processing device in which the information recording medium is installed, of the subsequential data in response to a read instruction for a title that is associated with the subsequential data.

Note that the usage control information for the CPS unit is associated with content stored on the disc, structured so that a dummy title is set for each individual CPS unit that is set in the disc, where the information processing device can select, for example, a title that is associated with dummy title subsequential data belonging to a unit that has the same usage control information as the usage control mode of the subsequential data.

The information recording medium further stores a subsequential data reading program that is evoked by a dummy title that is stored in advance on the disc, as explained above in reference to FIG. 5 to FIG. 9. The subsequential data reading program has settings that can be invoked from different titles in a plurality of different CPS units. The information processing device, when reading the subsequential data, performs the process of reading the subsequential data that is stored in the local storage unit by evoking the subsequential data reading program in accordance with the specification of the title that has been established as the title for the subsequential data.

The present invention has been explained in detail above in reference to specific examples of embodiment. However, obviously persons skilled in the art can modify and perform substitutions in the examples of embodiment in a range that does not deviate from the scope or intention of the present invention. That is, the present invention is disclosed in a form of examples, and these must not be interpreted to be limiting. The scope of patent claims should be considered in order to determine the scope and intent of the present invention.

Additionally, the series of processes described in the specification may be performed in hardware, in software, or in a structure that combines both. When a process is performed in software, a program wherein the processing sequence is recorded may be executed through installation into a memory within a computer that is built into specialized hardware, or may be performed through installation of a program into a general-use computer that can perform the various processes. For example, the program may be stored in advance in a recording medium. The program may be installed from the recording medium into a computer, or may be sent via a LAN (Local Area Network) or the network known as the Internet, to be installed into a built-in recording medium such as a hard drive.

Note that not only may the various processes described in this specification be performed in the time sequence according to the description, but may also be performed in parallel or individually, depending on the necessity or on the processing capability of the device that performs the processes. Furthermore, in the present specification, "the system" is a logical collective structure of a plurality of devices, and is not limited to each structural device being within the same frame.

(Potential for Use in Industry)

Given the structure in one example of embodiment of the present invention, as described above, when subsequential data that is obtained or generated subsequentially as data corresponding to content that is stored on a disc, such as a DVD, is stored in a local storage unit, such as a hard disk, a title, which is an index for specifying the reading of the subsequential data, is selected from dummy titles that are stored on the disc in advance, is set as the title for the subsequential data, and is stored in the local storage unit. Given this structure, it is possible to store subsequential data without changing the correspondence relationship between the titles and the CPS units, which are the units for controlling the content recorded on a disc. The result is that it is possible to perform recording and usage processes of the subsequential data without updating the content certificates (CC).

The invention claimed is:

1. An information processing device comprising:
a central processing unit (CPU) operable to:
load a disc, which stores content that is divided into content control units;
select a dummy title, that is an index for reading data, from dummy titles stored in advance on the disc, wherein the data is associated with the content stored on the disc and used in conjunction when reading the content stored on the disc, wherein the data is downloaded from a server;
set the selected dummy title as a title for the data;
store the data in a local storage unit of the information processing device; and
store a virtual file system in the local storage unit, wherein the virtual file system is constructed by combining the data and the content, wherein the content stored in the disc and the data stored in the local storage unit are read in conjunction using the virtual file system.

2. The information processing device as set forth in claim 1, wherein
the content stored on the disc has settings, wherein an association is defined with usage control information, and
the CPU is operable to set as a membership unit of the data, a content control unit that is associated with the usage control information that matches usage control status of the data.

3. The information processing device as set forth in claim 2, wherein
the content stored on the disc has a setting to determine whether there is a correspondence to encrypted content by the content control unit,
wherein if the data is encrypted data, then a content control unit corresponding to encrypted content is set as a membership unit, and if the data is non-encrypted data, then a content control unit corresponding to non-encrypted content is set as a membership unit.

4. The information processing device as set forth in claim 1, wherein the CPU is operable to set a membership unit of the data in accordance with unit specifying information received from the server.

5. The information processing device as set forth in claim 1, wherein
dummy titles that are recorded in advance on the disc have a structure that is set as a title that evokes a program for reading the data, wherein the program for reading the data is recorded on the disc, and
the CPU is operable to evoke the program for reading the data depending on specification of the dummy title that is set as the title for the data, to read the data that is stored in the local storage unit.

6. The information processing device as set forth in claim 5, wherein
the program for reading the data is set to be evoked by different titles of a plurality of content control units that are set on the disc, and
the CPU is operable to evoke the program for reading the data, based on specifications of the different titles of the plurality of content control units, to read the data.

7. The information processing device as set forth in claim 5, wherein the CPU is operable to:
receive an updating program for reading the data that is stored on the disc; and
store the updated program into the local storage unit as a setting that is evoked by the specification of the dummy title.

8. The information processing device as set forth in claim 1, wherein the CPU is operable to identify a unit belonging to the content being read in the information processing device, and to perform a read content limiting process that selects, as read-enabled content, the data belonging to the same unit as the identified unit.

9. The information processing device as set forth in claim 8, wherein the CPU is operable to execute the read content limiting process in accordance with a program for reading the data.

10. The information processing device as set forth in claim 1, wherein the CPU is operable to structure the virtual file system to perform parallel reading of the content stored on the disc and the data stored in the local storage unit.

11. The information processing device as set forth in claim 1, wherein filenames of the data stored in the local storage unit are converted in accordance with a file named conversion table when the CPU structures the virtual file system.

12. The information processing device as set forth in claim 1, wherein the CPU constructs the virtual file system by virtually combining directory and files of the local storage unit, and directories and files of the disc.

13. The information processing device as set forth in claim 12, wherein the virtual file system is updated each time when there is a change in the directory or files of the local storage unit.

14. The information processing device as set forth in claim 1, wherein the content stored on the disc comprises an Audio Visual (AV) stream data, a Media Key Block that enables acquisition of a media key required for decrypting the content, a process control file, usage control information, and a CPS Unit Key File that stores data required to obtain a CPS unit key for decrypting the CPS.

15. A non-transitory computer readable medium having stored thereon, a program for controlling data in an information processing device, wherein an information recording device loaded in the information processing device comprises:
content including stream data to be read and titles that are indexes for specifying data reading,
wherein the content is divided into units as content control units,
wherein the titles include dummy titles that are set as indexes in association with the data, that is stored in a local storage unit of the information processing device after being acquired from a server, to enable reading of the data in response to a read instruction for a title that is associated with the data,
wherein the data is associated with the content stored in the information recording device and used in conjunction when reading the content stored in the information recording device,
wherein a virtual file system, constructed by combining the data and the content stored in the information recording device, is stored in the local storage unit,
wherein the content stored in the information recording device and the data stored in the local storage unit are read in conjunction using the virtual file system.

16. The non-transitory computer readable medium as set forth in claim 15, wherein
usage control information for a content control unit is associated with the stream data stored on the information recording device,
wherein the dummy titles are set for each individual content control unit that is set in the information recording device,
wherein a dummy title that is associated with the data in the information recording device is set to be selectable from dummy titles that belong to a content control unit that has usage control information matching usage control status of the data.

17. The non-transitory computer readable medium as set forth in claim 15, wherein
a program for reading the data evoked by the dummy title is stored in advance on the information recording device, and
the information processing device, when reading the data, evokes the program for reading the data in response to the specification of a dummy title that is set as a title for the data, to read the data that is stored in the local storage unit.

18. The non-transitory computer readable medium as set forth in claim 17, wherein the program for reading the data is a program set to be evoked by different titles of a plurality of content control units that are set in the information recording device.

19. An information processing method comprising:
loading a disc storing content that is divided into content control units in an information processing device, wherein data associated with the content stored in the disc is downloaded from a server, wherein the data is used in conjunction when reading the content stored on the disc;
selecting, from dummy titles stored in advance on the disc, a dummy title that is an index for specifying reading of the data;
setting the selected dummy title as a title for the data;
storing the data in a local storage unit; and
storing a virtual file system, constructed by combining the data stored in the local storage unit and the content stored on the disc, in the local storage unit, wherein the content stored in the disc and the data stored in the local storage unit are read in conjunction using the virtual file system.

20. A non-transitory computer readable medium having stored thereon, a program for controlling data in an information processing device, the program when executed by a computer cause the computer to:
load a disc storing content that is divided into usage control units into the information processing device, wherein the data is associated with the content stored in the disc and used in conjunction when reading the content stored in the disc, wherein the data is downloaded from a server;
select, from dummy titles stored in advance on the disc, a dummy title that is an index for specifying reading of the data;
set the selected dummy title as a title for the data;
store the data in a local storage unit of the information processing device; and
store a virtual file system, constructed by combining the data stored in the local storage unit and the content stored on the disc, in the local storage unit, wherein the content stored in the disc and the data stored in the local storage unit are read in conjunction using the virtual file.

* * * * *